(12) United States Patent
Weiss et al.

(10) Patent No.: US 12,441,984 B2
(45) Date of Patent: Oct. 14, 2025

(54) ISOLATION, PRESERVATION, AND EXPANSION OF CANINE UMBILICAL CORD MESENCHYMAL STROMAL CELLS

(71) Applicant: Kansas State University Research Foundation, Manhattan, KS (US)

(72) Inventors: Mark L. Weiss, Manhattan, KS (US); Adrienne Wright, Manhattan, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 667 days.

(21) Appl. No.: 17/774,968

(22) PCT Filed: Nov. 5, 2020

(86) PCT No.: PCT/US2020/059143
§ 371 (c)(1),
(2) Date: May 6, 2022

(87) PCT Pub. No.: WO2021/092199
PCT Pub. Date: May 14, 2021

(65) Prior Publication Data
US 2022/0380731 A1    Dec. 1, 2022

Related U.S. Application Data

(60) Provisional application No. 62/932,844, filed on Nov. 8, 2019.

(51) Int. Cl.
*A61K 35/12* (2015.01)
*C12N 5/0775* (2010.01)

(52) U.S. Cl.
CPC ........ *C12N 5/0668* (2013.01); *C12N 2500/32* (2013.01); *C12N 2501/115* (2013.01);
(Continued)

(58) Field of Classification Search
None
See application file for complete search history.

(56) References Cited

U.S. PATENT DOCUMENTS

| 7,547,546 B2 | 6/2009 | Davies et al. |
| 7,736,892 B2 | 6/2010 | Weiss et al. |

(Continued)

FOREIGN PATENT DOCUMENTS

| WO | 2017132358 | 8/2017 |
| WO | 2018138322 | 8/2018 |
| WO | 2019038322 | 2/2019 |

OTHER PUBLICATIONS

Seo MS, Jeong YH, et al. Isolation and characterization of canine umbilical cord blood-derived mesenchymal stem cells. J Vet Sci. Sep. 2009;10(3):181-7. doi: 10.4142/jvs.2009.10.3.181. Erratum in: J Vet Sci. Dec. 2009;10(4):369. PMID: 19687617; PMCID: PMC2801133. (Year: 2009).*

(Continued)

*Primary Examiner* — Evelyn Y Pyla
*Assistant Examiner* — Jagamya Vijayaraghavan
(74) *Attorney, Agent, or Firm* — Hovey Williams LLP; Crissa A. Cook

(57) ABSTRACT

Methods for improved handling of isolated canine umbilical cord mesenchymal stromal cells (UC-MSCs), including methods for expansion of canine UC-MSCs, cryopreservation and improved post-thaw viability using adherent plates, as well as standardized methods and kits for characterizing isolated canine UC-MSCs in a cell population. Methods for improved detachment or dissociation of adherent cells and new dissociation reagents comprising nattokinase are also disclosed.

16 Claims, 21 Drawing Sheets

Specification includes a Sequence Listing.

(52) U.S. Cl.
CPC ...... *C12N 2509/00* (2013.01); *C12N 2513/00* (2013.01); *C12N 2533/50* (2013.01); *C12N 2533/70* (2013.01)

(56) References Cited

U.S. PATENT DOCUMENTS

| | | | |
|---|---|---|---|
| 8,105,634 | B2 | 1/2012 | Liu et al. |
| 8,318,483 | B2 | 11/2012 | Mistry et al. |
| 8,328,777 | B2 | 12/2012 | Kuzyk |
| 8,481,311 | B2 | 7/2013 | Davies et al. |
| 8,685,732 | B2 | 4/2014 | Font Perez et al. |
| 8,703,411 | B2 | 4/2014 | Chang et al. |
| 8,790,923 | B2 | 7/2014 | Ennis et al. |
| 8,815,587 | B2 | 8/2014 | Harris et al. |
| 9,175,261 | B2 | 11/2015 | Harmon et al. |
| 9,498,501 | B2 | 11/2016 | Mistry et al. |
| 9,611,456 | B2 | 4/2017 | Davies et al. |
| 9,611,513 | B2 | 4/2017 | Dorai et al. |
| 9,717,763 | B2 | 8/2017 | Mistry et al. |
| 9,771,555 | B2 | 9/2017 | Kang et al. |
| 10,066,209 | B2 | 9/2018 | Phan |
| 2010/0159025 | A1 | 6/2010 | Kramer et al. |
| 2013/0078221 | A1 | 3/2013 | Kang et al. |
| 2016/0186142 | A1 | 6/2016 | Serteyn et al. |
| 2017/0000886 | A1 | 1/2017 | Chang et al. |
| 2018/0066067 | A1 | 3/2018 | Cong et al. |
| 2018/0092348 | A1 | 4/2018 | She et al. |
| 2018/0206480 | A1 | 7/2018 | Ghosh |

OTHER PUBLICATIONS

Rubin H. Deprivation of glutamine in cell culture reveals its potential for treating cancer. Proc Natl Acad Sci U S A. Apr. 2, 2019;116(14):6964-6968. doi: 10.1073/pnas.1815968116. Epub Mar. 15, 2019. PMID: 30877243; PMCID: PMC6452721. (Year: 2019).*

Bertolo A, Steffen F, Malonzo-Marty C, Stoyanov J. Canine Mesenchymal Stem Cell Potential and the Importance of Dog Breed: Implication for Cell-Based Therapies. Cell Transplant. 2015;24(10):1969-80. doi: 10.3727/096368914X685294. Epub Nov. 5, 2014. PMID: 25375819. (Year: 2015).*

Yaneselli KM, Kuhl CP, et al. Comparison of the characteristics of canine adipose tissue-derived mesenchymal stem cells extracted from different sites and at different passage numbers. J Vet Sci. Jan. 31, 2018;19(1):13-20. doi: 10.4142/jvs.2018.19.1.13. PMID: 28693305; PMCID: PMC5799390. (Year: 2018).*

Carrion B, Janson IA, Kong YP, Putnam AJ. A safe and efficient method to retrieve mesenchymal stem cells from three-dimensional fibrin gels. Tissue Eng Part C Methods. Mar. 2014;20(3):252-63. doi: 10.1089/ten.TEC.2013.0051. Epub Aug. 14, 2013. PMID: 23808842; PMCID: PMC3936512. (Year: 2014).*

Romanov, Y.A., Svintsitskaya, V.A. and Smirnov, V.N. (2003), Searching for Alternative Sources of Postnatal Human Mesenchymal Stem Cells: Candidate MSC-Like Cells from Umbilical Cord. Stem Cells, 21: 105-110. https://doi.org/10.1634/stemcells.21-1-105 (Year: 2003).*

Devireddy LR, Myers M, Screven R, Liu Z, Boxer L. A serum-free medium formulation efficiently supports isolation and propagation of canine adipose-derived mesenchymal stem/stromal cells. PLoS One. Feb. 27, 2019;14(2):e0210250. doi: 10.1371/journal.pone. 0210250. PMID: 30811421; PMCID: PMC6392232. (Year: 2019).*

Pilz GA, Braun J, Ulrich C, Felka T, Warstat K, Ruh M, Schewe B, Abele H, Larbi A, Aicher WK. Human mesenchymal stromal cells express CD14 cross-reactive epitopes. Cytometry A. Aug. 2011;79(8):635-45. doi: 10.1002/cyto.a.21073. Epub Jul. 6, 2011. PMID: 21735544. (Year: 2011).*

International Search Report and Written Opinion in corresponding PCT/US2020/059143, dated Feb. 9, 2021.

* cited by examiner

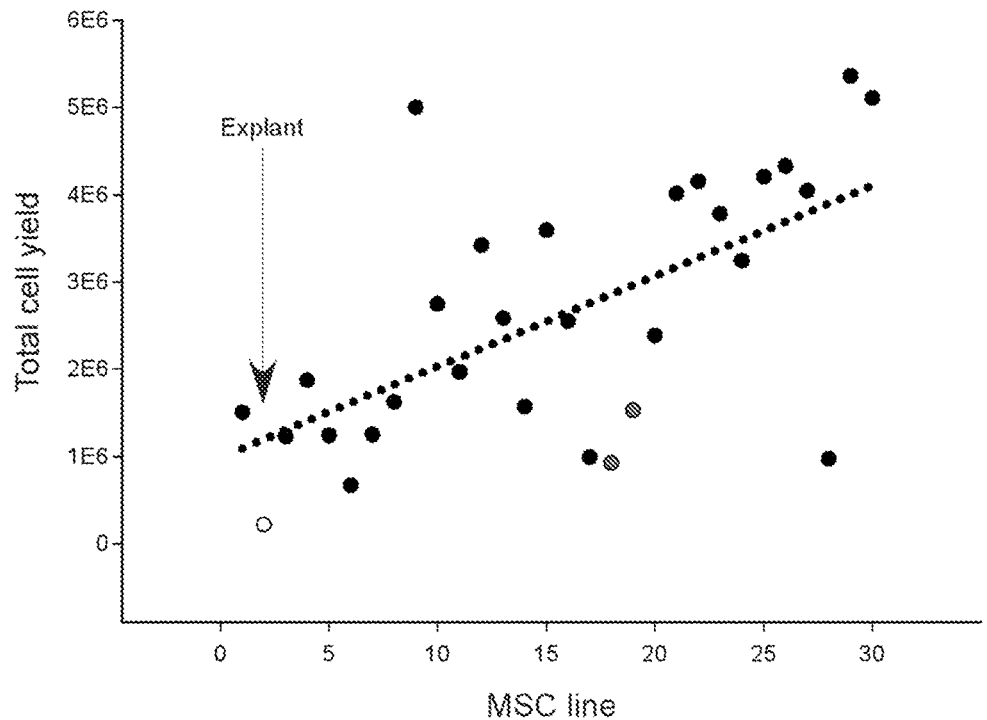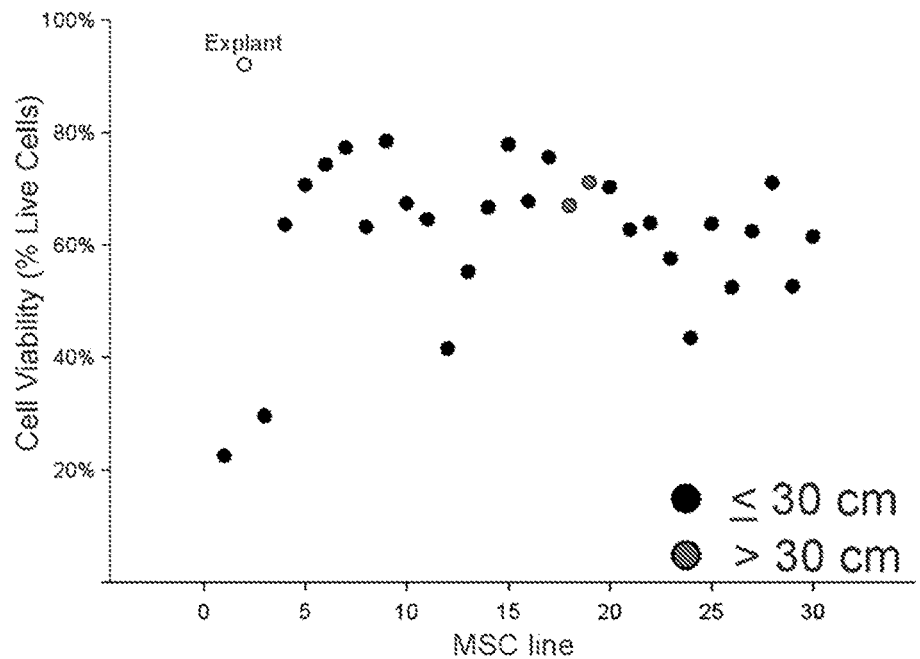
FIG. 2

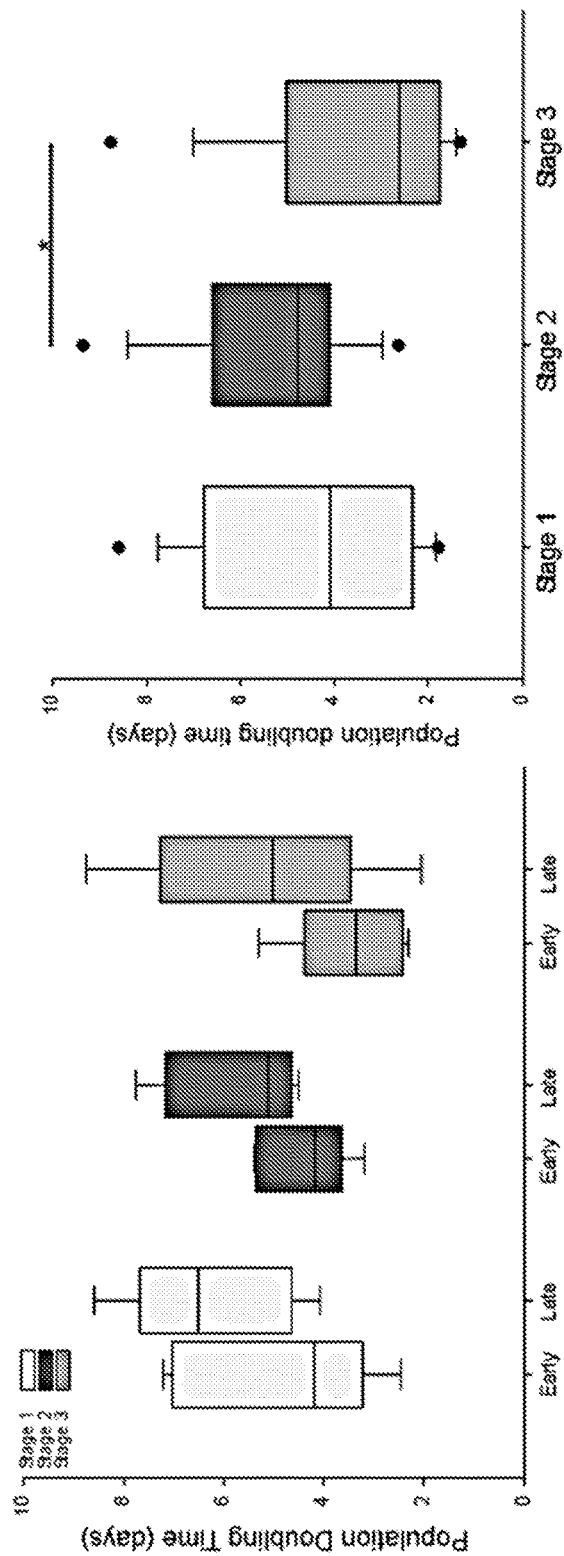
FIG. 3D
FIG. 3E
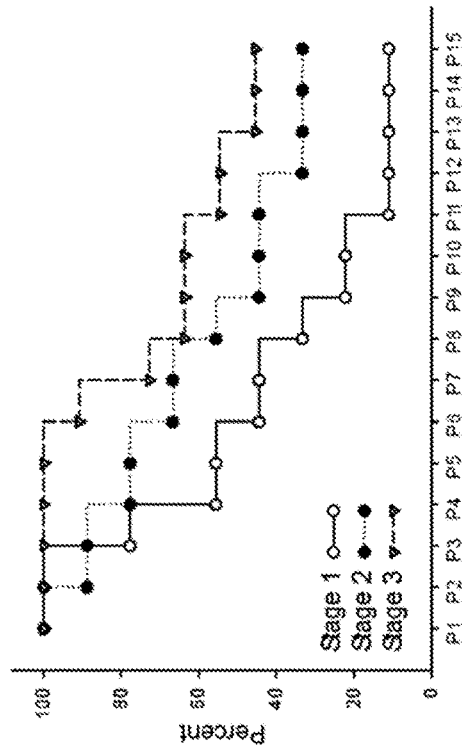
FIG. 3F

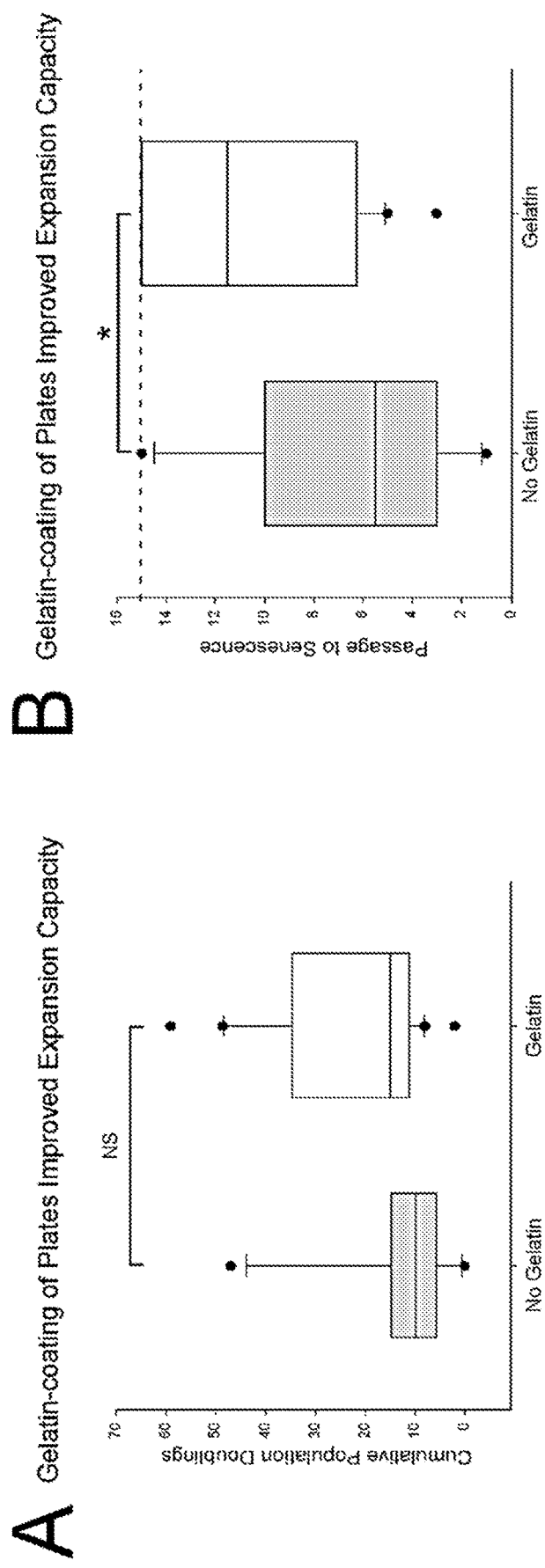
FIG. 5A-B

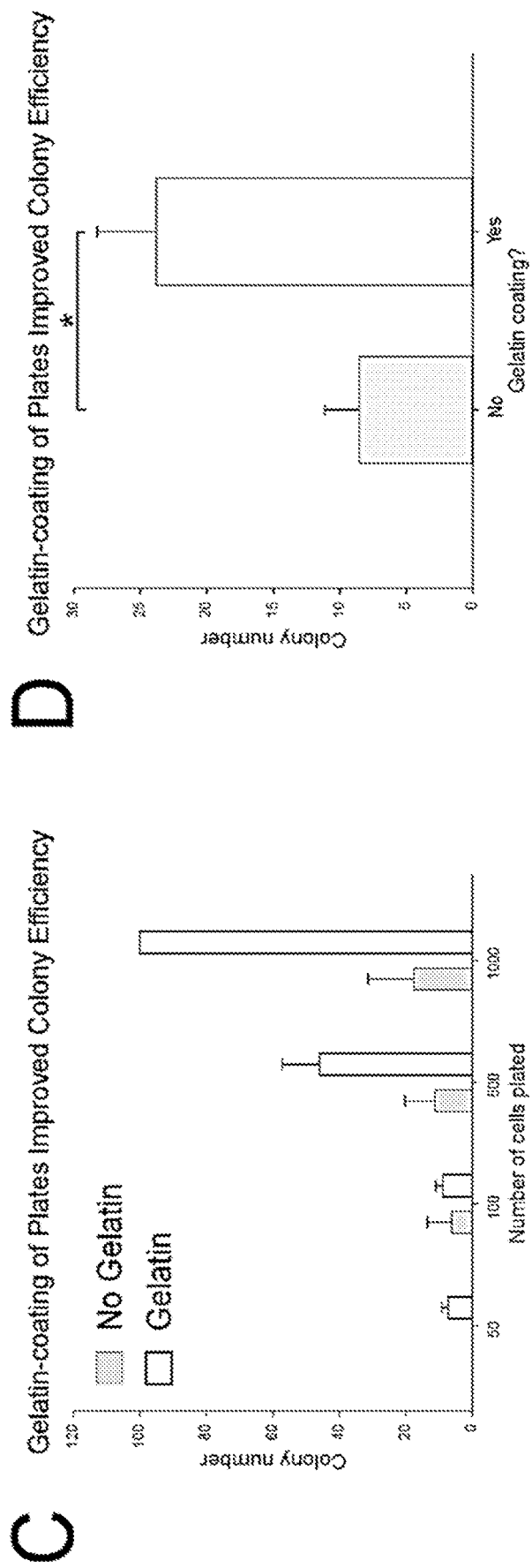
FIG. 5C-D

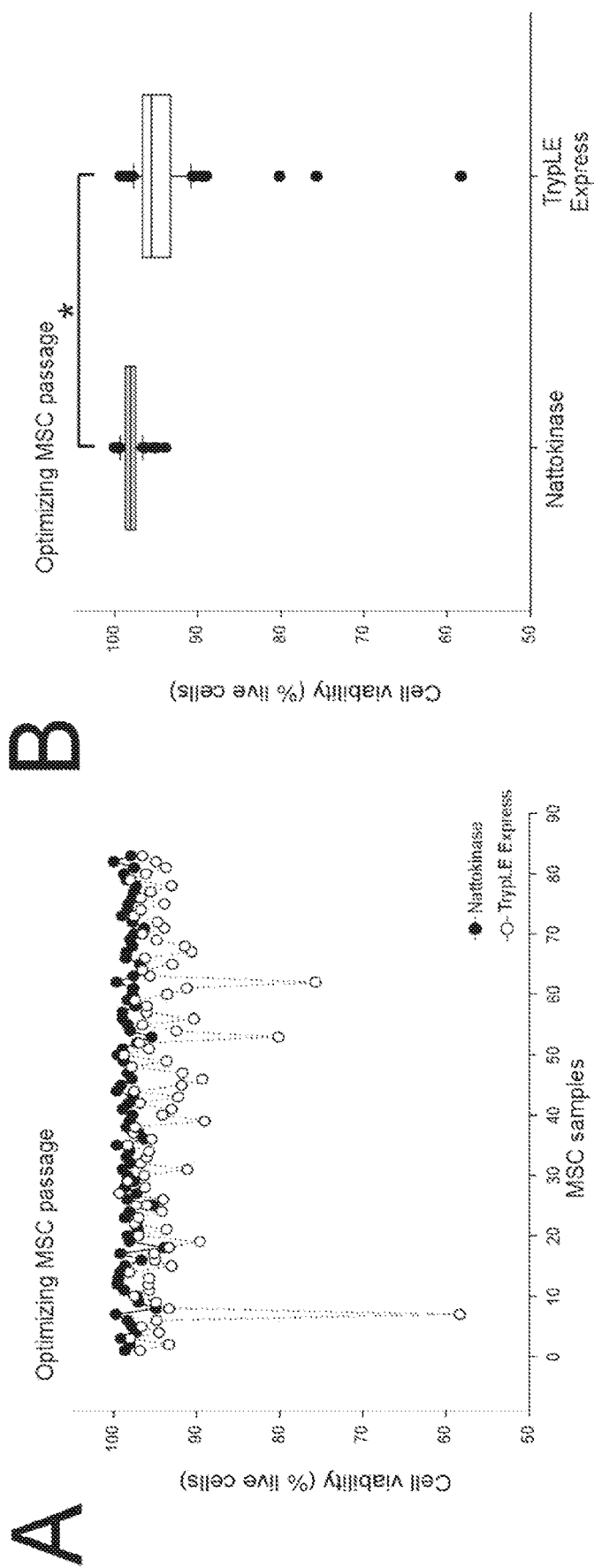
FIG. 6A-B

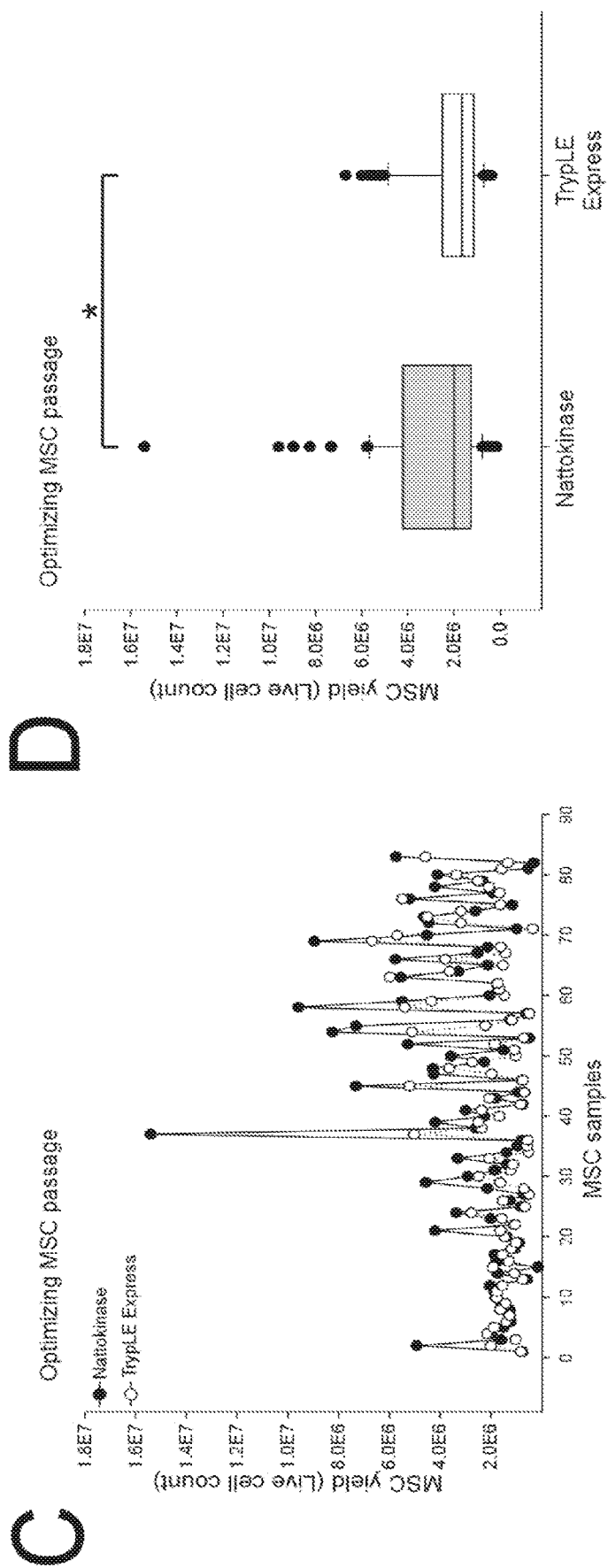
FIG. 6C-D

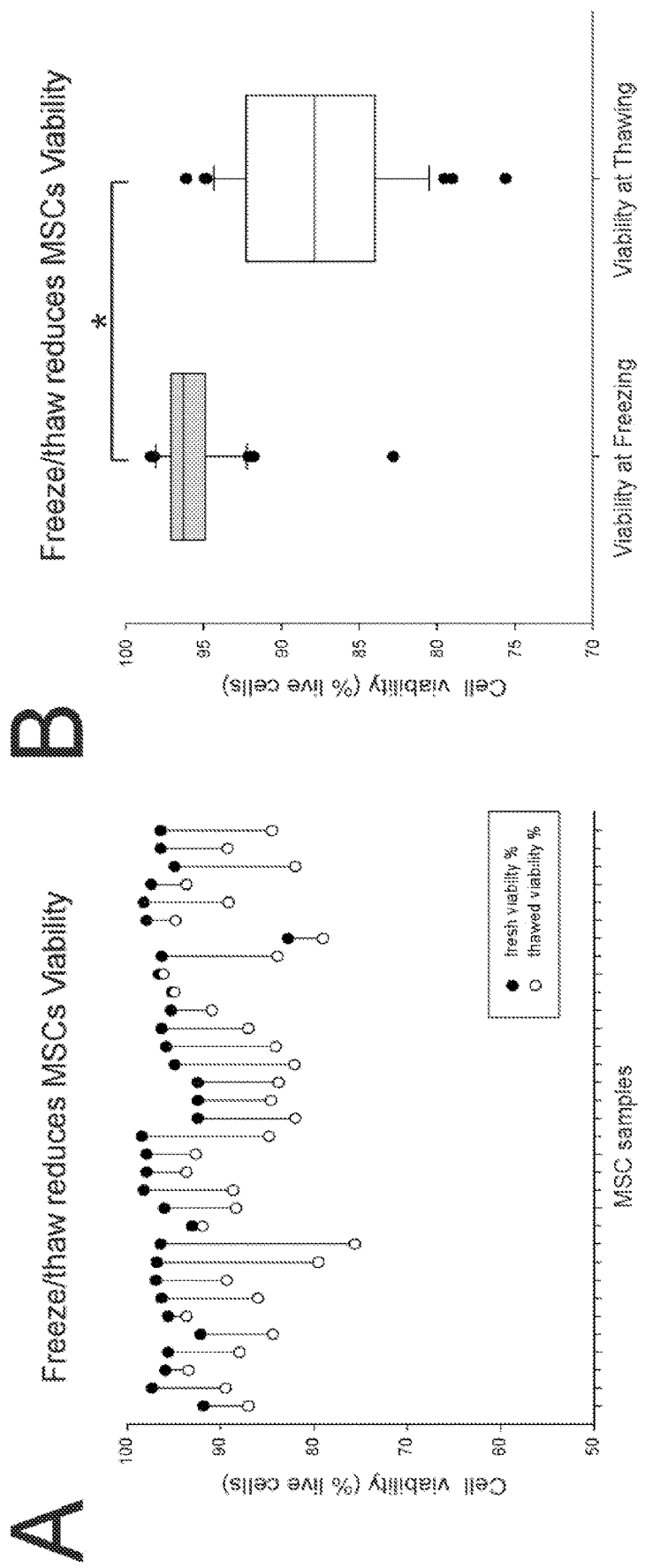
FIG. 7A-B

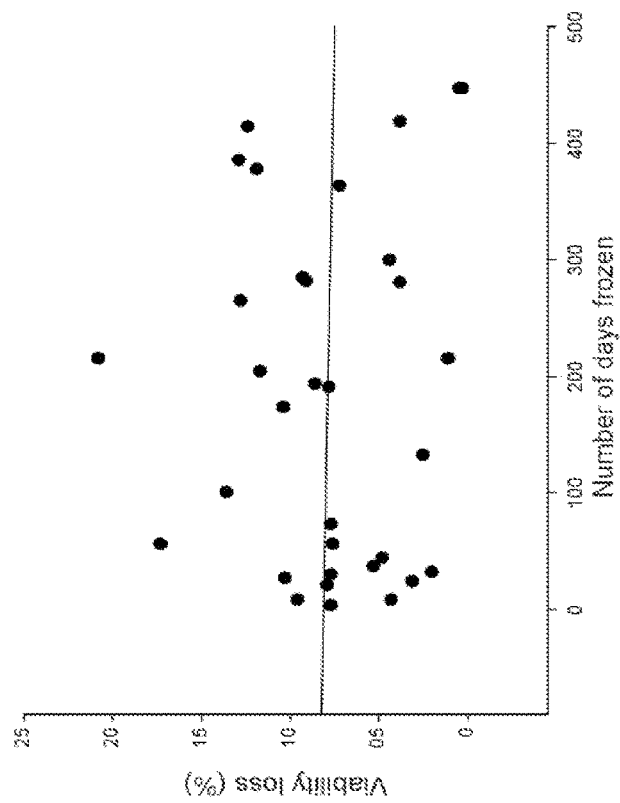
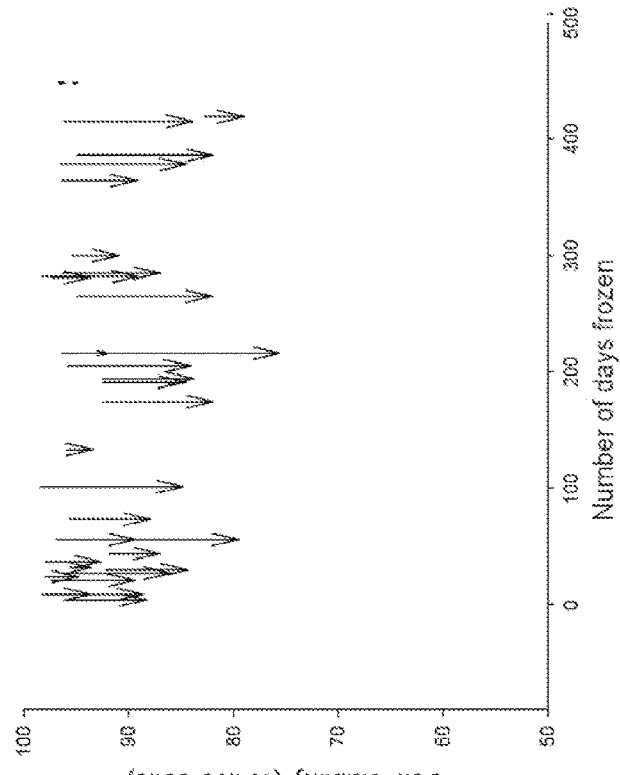
FIG. 7C-D

SEQUENCE LISTING

```
<160> NUMBER OF SEQ ID NOS: 20

<210> SEQ ID NO 1
<211> LENGTH: 20
<212> TYPE: DNA
<213> ORGANISM: Artificial Sequence
<220> FEATURE:
<223> OTHER INFORMATION: Synthetic PCR primer

<400> SEQUENCE: 1
gtgccaacct ccacagaaat                                                   20

<210> SEQ ID NO 2
<211> LENGTH: 20
<212> TYPE: DNA
<213> ORGANISM: Artificial Sequence
<220> FEATURE:
<223> OTHER INFORMATION: Synthetic PCR primer

<400> SEQUENCE: 2
tgatggtact tggggtgtca                                                   20

<210> SEQ ID NO 3
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 3
ccctttgggt tcacaaacac                                                   20

<210> SEQ ID NO 4
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 4
tccgaaccat ttccaggtag                                                   20

<210> SEQ ID NO 5
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 5
ccatacaact gctcccacaa                                                   20

<210> SEQ ID NO 6
<211> LENGTH: 20
<212> TYPE: DNA
<213> ORGANISM: Artificial Sequence
<220> FEATURE:
<223> OTHER INFORMATION: Synthetic PCR primer.
```

<400> SEQUENCE: 6
acaaagcctt cccattcaaa                                               20

<210> SEQ ID NO 7
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 7
aacagcactg ttgcccttct                                               20

<210> SEQ ID NO 8
<211> LENGTH: 21
<212> TYPE: DNA
<213> ORGANISM: Artificial Sequence
<220> FEATURE:
<223> OTHER INFORMATION: Synthetic PCR primer.

<400> SEQUENCE: 8
tggtcacaat tcacggtatc a                                             21

<210> SEQ ID NO 9
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 9
actgggacac tctggtttcg                                               20

<210> SEQ ID NO 10
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 10
attccttaaa gcggcaggat                                               20

<210> SEQ ID NO 11
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 11
tgcattgcag cctgaagtag                                               20

<210> SEQ ID NO 12
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 12
ctgttttccc caattcctga                                               20

<210> SEQ ID NO 13
<211> LENGTH: 20

```
<212> TYPE: DNA
<213> ORGANISM: Artificial Sequence
<220> FEATURE:
<223> OTHER INFORMATION: Synthetic PCR primer.

<400> SEQUENCE: 13
acatgtgaac tccggctctc                                        20

<210> SEQ ID NO 14
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 14
agaagcgact ctgggacaaa                                        20

<210> SEQ ID NO 15
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 15
cgtgatctat ggcactgtgg                                        20

<210> SEQ ID NO 16
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 16
gcagcactgg gattccttag                                        20

<210> SEQ ID NO 17
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 17
aggagtcaac accacggaac                                        20

<210> SEQ ID NO 18
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 18
gatctgcatg ttgtggttgg                                        20

<210> SEQ ID NO 19
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 19
```

```
ccaatgctac cgtggaagtt                                              20
```

```
<210> SEQ ID NO 20
<211> LENGTH: 20
<212> TYPE: DNA
<213> ORGANISM: Artificial Sequence
<220> FEATURE:
<223> OTHER INFORMATION: Synthetic PCR primer.

<400> SEQUENCE: 20
gattgcagaa ggacggtgat                                              20
```

ISOLATION, PRESERVATION, AND EXPANSION OF CANINE UMBILICAL CORD MESENCHYMAL STROMAL CELLS

CROSS-REFERENCE TO RELATED APPLICATIONS

The present application is the U.S. National Stage of International Patent Application No. PCT/US2020/059143, filed Nov. 5, 2020, which claims the priority benefit of U.S. Provisional Patent Application Ser. No. 62/932,844, filed Nov. 8, 2019, entitled ISOLATION, PRESERVATION, AND EXPANSION OF CANINE UMBILICAL CORD MESENCHYMAL STROMAL CELLS, each of which is incorporated by reference in its entirety herein.

SEQUENCE LISTING

The following application contains a sequence listing in computer readable format (CRF), submitted via EFS-Web_as a text file in ASCII format entitled "Sequence Listing," created on Nov. 5, 2020, as 4,180 bytes to serve as both the paper copy and CRF in compliance with 37 C.F.R. 1.821. The content of the CRF ASCII text file is hereby incorporated by reference.

BACKGROUND OF THE INVENTION

Field of the Invention

The present invention relates to new methods and techniques for use in cell culture, and particular for canine mesenchymal stromal cells.

Description of Related Art

Multipotent mesenchymal stromal cells (MSCs) are a heterogeneous population of cells that includes stem, progenitor, and differentiated cells. MSCs were originally described the 1960's as the fibroblastic population of adherent cells derived from bone marrow that are distinct from the hematopoietic cells found in that niche. Since then MSCs have been isolated from adult tissues, such as adipose (AT) and bone marrow (BM), and extraembryonic tissues such as the placenta and umbilical cord (UC). MSCs hold great promise in the field of regenerative medicine due to their ability to create a variable localized anti-inflammatory effect in injuries such as Crohn's disease and osteoarthritis or by incorporation in tissue engineered constructs. Currently, the MSC literature uses rodents for preclinical disease models. There is growing interest in using naturally occurring disease in large animals for modeling human disease. By review of the canine MSCs literature, it appears that canine MSCs can be difficult to maintain in culture for extended passages and this greatly varies between tissue sources, compared to human and rodent MSCs, and limited lifespan is an obstacle for preclinical investigation and therapeutic use. Research using canine MSCs has been focused on cells derived from bone marrow or adipose tissue, and the differences in manufacturing MSCs between laboratories is problematic due to lack of standardization. While there may be differences in the MSC populations isolated from each source that could impact their value for regenerative medicine applications, MSCs derived from UC have several advantages over adult tissue sources: UCs are collected non-surgically from a discarded tissue, they can be collected with no risk or pain to the donor, and they are collected from individuals of a consistent, young age. Thus, UC-MSCs are a limitless and non-controversial source of MSCs.

SUMMARY OF THE INVENTION

The present disclosure is broadly concerned with methods for expanding isolated canine umbilical cord mesenchymal stromal cells (UC-MSCs). The methods generally adding isolated canine UC-MSCs and cell culture media to a first adherent cell culture substrate. The cell culture media is advantageously supplemented with FBS, glutamine, and fibroblast growth factor-basic. The isolated canine UC-MSCs are incubated under conditions to yield cultured canine UC-MSCs, and transferred to a second adherent cell culture substrate. This involves subjecting the cultured canine UC-MSCs to a dissociation reagent to detach the cells from the first adherent cell culture substrate and moving the detached cells to the second adherent cell culture substrate. The isolated canine UC-MSCs transferred to the second adherent cell culture substrate are incubated under conditions to yield expanded canine UC-MSCs, wherein the expanded canine UC-MSCs have a cell population that is greater than the original population of the isolated canine UC-MSCs.

Methods described herein also concern cryopreservation of isolated canine UC-MSCs, as well as repeated passaging of isolated canine UC-MSCs. The methods contemplated herein also include methods for differentiating canine UC-MSCs into osteogenic, chondrogenic, or adipogenic cell lineages.

Also described herein are kits for standardized characterization of canine UC-MSCs, including antibodies for canine UC-MSCs cell surface markers: CD5, CD11b, CD21, CD14, CD34, CD44, CD45, CD73, CD90, and/or CD105.

Methods of detecting canine UC-MSCs in a cell population are also described herein. The methods generally comprise preparing a cell population from canine umbilical cord tissue comprising dissociated canine MSCs, and selecting for CD34+, CD44+, CD73+, CD90+, and/or CD105+ cells, which are not expressing CD5, CD11b, CD14, CD21, and/or CD45.

Enriched populations of canine UC-MSCs are also disclosed herein, which can be produced by the various disclosed methods.

The present disclosure also concerns methods of improving post-thaw viability of cryopreserved canine UC-MSCs. The methods generally comprise thawing a cryopreserved composition of isolated canine UC-MSCs dispersed in a culture media consisting essentially of DMEM, supplemented with FBS, glutamine, fibroblast growth factor-basic, and optional antibiotic-antimycotic, and a DMSO cryoprotectant solution. The thawed canine UC-MSCs are washed to remove the cryoprotectant and then immediately plated on an adherent substrate.

Also described herein are novel methods for detachment of adherent cells and/or cell monolayers from a substrate surface. The methods generally comprise contacting cells cultured on a substrate surface with a dissociation reagent, wherein the dissociation reagent comprises nattokinase. The present disclosure also concerns a novel dissociation reagent for use in detaching adherent cells and/or cell monolayers from a substrate surface or for use in dissociating cells from tissues, organoids, tumors, or 3-dimensional cell matrices, comprising nattokinase. Similarly, methods for dissociating cells from tissues, organoids, tumors, or 3-dimensional cell matrices are also disclosed. The methods generally comprise contacting a tissue, organoid, tumor, or 3-dimensional cell matrix comprising a plurality of cells with a dissociation reagent for an effective period of time to dissociate the cells therefrom, wherein the dissociation reagent comprises nattokinase.

BRIEF DESCRIPTION OF THE DRAWINGS

FIG. 2 shows graphs demonstrating the efficiency of isolating MSCs from umbilical cord. A. The total cell yields from three different variables tested: Explant methods (n=1, white circle), mechanical and enzymatic extraction of <30 cm of cord tissue (red circles) or >than 30 cm of cord tissue (black circles). Note that over the course of this experiment our isolation efficiency improved statistically (positive and significant regression line). Note that the explant method was too inefficient to consider for scale-up. Note that adding more tissue to the C-tube did not improve yield or cell viability. This suggests that scale-up might be by using more C-tubes. B. The cell viability after the isolation. Note that the explant method produced the highest cell viability. This was offset by the lowest yield (in A). In contrast, the mechanical and enzymatic methods produced a viability of between 50 and 80%.

FIG. 3D shows population doubling time by Stage and time in culture (Stage 1, yellow boxes; Stage 2, blue boxes; Stage 3, green boxes). Note that the box plots indicate median and $25^{th}$ and 75 percentile and the whiskers indicate $10^{th}$ and $90^{th}$ percentiles. Each stage is further broken into early and late passage. "Early" is defined as passages 0-4 and "late" is defined as passage 5-10. From this one can see that moving to Stage 2, the addition of gelatin-coating and Nattokinase for lifting MSCs, but no change to medium did not greatly change MSC growth rate, but tended to reduce senescence. In contrast, in stage 3, changing the medium formulation increased MSC growth, especially in the early passage epoch.

FIG. 3E shows population doubling time by Stage (Stage 1, yellow boxes; Stage 2, blue boxes; Stage 3, green boxes). When population doubling time was averaged (over all passages by stage), a significant increase in growth rate was observed between Stages 2 and 3. The median growth rate of Stage 3 was about 2.5 days.

FIG. 3F shows loss of MSC proliferation over passage by Stage. Percentage of expanding MSC lines by passage and by Stage (Stage 1, yellow dot; Stage 2, blue dots; Stage 3, green triangles). Note that while sustaining MSCs in culture showed a marked improvement over the 3 Stages (in FIG. 3F), just 50 percent of the lines were able to achieve 15 passages in Stage 3. This suggests that improvements in culture conditions may be identified in future work. Dotted lines in panel A indicate statistically significant, positive regression lines indicating improvement over the project. Box plots in panels D and E indicate median, $25^{th}$ and $75^{th}$ percentiles; whiskers indicate $10^{th}$ and $90^{th}$ percentiles (Potential outliers indicated by filled circles). * Indicates significant (p<0.05) using a two-tailed test.

FIG. 5A-B shows that gelatin-coating of plates improved canine MSCs expansion. A. When comparing canine MSCs grown in the same medium (e.g., cumulative data from Stages 1 vs 2), gelatin-coating of plates tended to improve the cumulative population doublings achieve, but this was not statistically significant. B. In contrast, when comparing the number of passages to senescence for Stages 1 and 2, gelatin-coated plates significantly improved MSC's ability to achieve more passages.

FIG. 5C-D shows that C. gelatin-coating of the tissue culture plastic also improved the ability to perform CFU-F assays, as indicated by the number of colonies obtained per number of cells seeded, and also D. improved colony forming efficiency by gelatin coating. Gelatin-coating significantly improves colony number compared to uncoated plates. Box plots indicate median, 25th and $75^{th}$ percentiles; whiskers indicate $10^{th}$ and $90^{th}$ percentiles (Potential outliers indicated by filled circles). * Indicates significant (p<0.05) using a two-tailed test.

FIG. 6A-B shows that nattokinase improved MSC passage compared to TrypLE Express. A. Side by side comparison of cell viability when MSCs at the same passage were lifted by TrypLE express or Nattokinase (83 independent trials). B. Summarized data from A. Nattokinase significantly improved MSC viability at passage (median of 98.1% for Nattokinase, median of 95.6% for TrypLE Express).

FIG. 6C-D shows C. side by side comparison of MSC yield at passage when MSCs of the same passage were lifted with TrypLE Express or Nattokinase, and D. summarized data from C. Nattokinase significantly improved cell yield at passage (median of 1.99E6 cells for Nattokinase, median of 1.64E6 for TrypLE Express, a 21.3% improvement). Box plots indicate median, $25^{th}$ and $75^{th}$ percentiles; whiskers indicate $10^{th}$ and $90^{th}$ percentiles (Potential outliers indicated by filled circles). * Indicates significant ($p<0.05$) using a two-tailed test.

FIG. 7A-B shows that cryostorage reduces the viability of canine MSCs. A. Side-by-side comparison of the viability of 33 MSC samples before (black circles) and after cryostorage (white circles) shows consistent loss of viability resulting from freeze/thaw cycle. B. Summarized data from A. Cryostorage significantly reduces canine MSC viability.

FIG. 7C-D shows that cryostorage reduces the viability of canine MSCs. C. Side-by-side comparison of the effect of time on MSC viability at thaw. Each vector indicates the change in viability from fresh to after thaw for an individual canine MSC sample. The X axis indicates the number of days in cryostorage prior to thaw. By inspection there did not appear to be a time-dependent loss in viability due to cryostorage. D. Change in viability (indicated by vector length in C) vs. days frozen. Regression analysis reveals no significant relationship between change in viability over time (although a negative trend line is observed). Box plots indicate median, 25th and 75th percentiles; whiskers indicate 10th and 90th percentiles (Potential outliers indicated by filled circles). * Indicates significant ($p<0.05$) using a two-tailed test.

DETAILED DESCRIPTION

Figure 1:
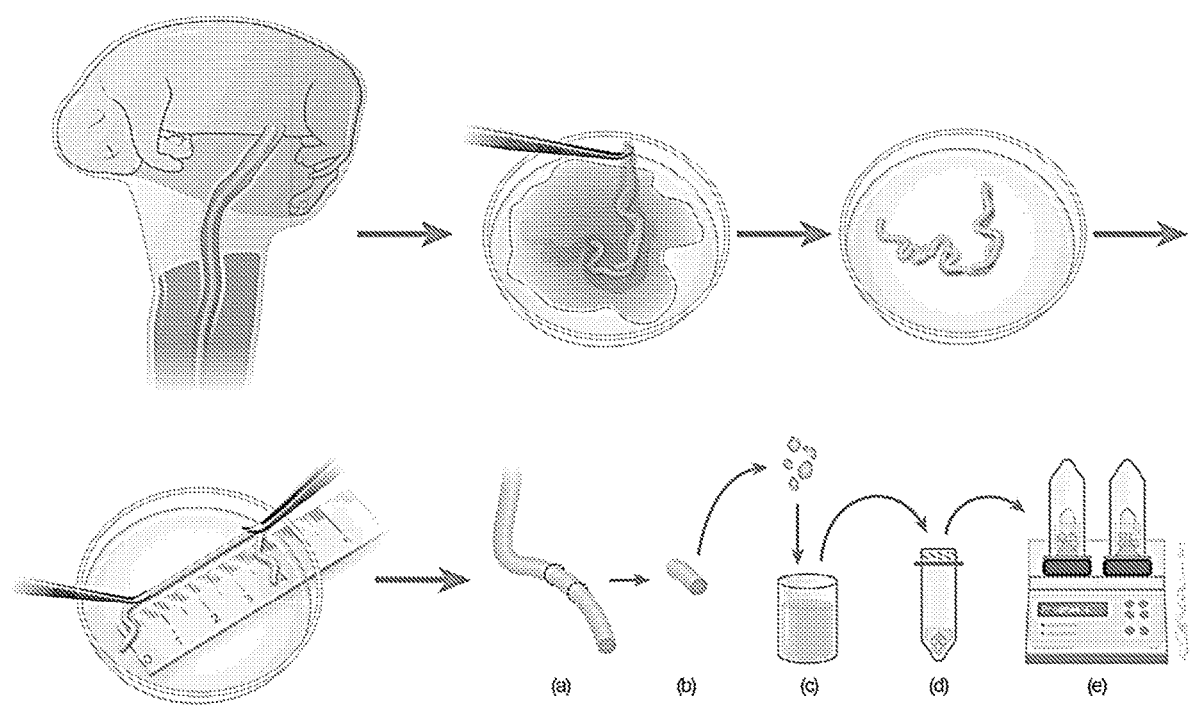
FIG. 1 is a schematic illustration of the isolation procedure showing the major steps involved for obtaining MSCs from the canine umbilical cord. Following Caesarian section delivery, the cord is removed from each puppy and placed into storage solution. The non-cord tissues are dissected and discarded using sterile technique. The length of the cord material is measured and it is ligated into lengths, rinsed and minced briefly. A fixed length is added to a Milliteny C-tube with enzymes. The tube is processed using a standard program and the tube is incubated prior to cell pellet isolation, counting, and plating.

Methods in accordance with embodiments of the present invention are generally directed to the isolation, preservation, and expansion of canine mesenchymal stromal cells (MSCs) from umbilical cord (UC) tissue. UC tissue is obtained from umbilical cords collected from canine neonates after birth, and from either male or female donors.

Canine MSCs have the potential to be a cell therapy or be used in tissue engineering. However, expansion of canine MSCs has proven to be problematic and the literature indicates a maximum life span of approximately 7 passages in vitro. We optimized the isolation, expansion and cryopreservation/revival of canine MSCs. Using the methods described here, >20 cumulative populations doublings is possible from >50% of canine MSC isolates. This is a significant improvement. New culture medium, improved culture conditions, new passage methods, prospective of identification of donors, improved freeze/thaw conditions, optimized tri-linage differentiation protocols, new RT-PCR based markers, optimized CFU-F protocols are also described.

MSCs hold great promise in the field of regenerative medicine due to their ability to enable functional recovery of injuries such as Crohn's disease and osteoarthritis or by incorporation in tissue engineered constructs. Currently, the MSC literature uses rodents for preclinical disease models. There is growing interest in using naturally occurring disease in large animals for modeling human disease. In review of canine MSC literature, it appears that canine MSCs are more difficult to isolate and maintain in culture compared to human and rodent MSCs. Research using canine MSCs has been focused on cells derived from bone marrow or adipose tissue, and the differences in manufacturing MSCs between laboratories is problematic due to lack of standardization. To address these issues, here, a stepwise process was used to optimize canine MSCs isolation, expansion, and cryopreservation utilizing canine UC-derived MSCs (UC-MSCs). The culture protocol utilizes coating of tissue culture surfaces to increase cellular adherence and colony-forming units-fibroblast efficiency, and decrease population doubling times. Canine MSCs isolated with our protocol could be maintained longer than published canine MSCs methods before senescing. Our improved cryopreservation protocols produce on average >90% viable MSCs at thaw when viability was examined from as short as one month to more than one year after storage. These methods enable master-bank and working-bank scenarios for allogeneic MSC testing in naturally occurring disease in dogs.

Current state of the art allows for short term culture and expansion of canine MSCs. The novel methods provided here, enable long term culture without senescence, and stable viability of canine umbilical cord derived MSCs. Also disclosed is a list of antibodies that can characterize canine MSCs and propose a characterization kit (antibody kit for canine MSCs), methods for freeze/thaw that sustain viability of MSCs for greater than 1 year, and expansion potential at thaw.

Canine MSCs are isolated from collected discarded umbilical cord tissue. Generally, umbilical cords can be stored, for example in a sterile buffered saline solution after collection. Preferably, the umbilical cord is processed within at least 5 days, more preferably within at least 4 days from collection, although cryopreserved tissue could be used. A preferred technique for isolating the cells from the tissue is described in detail in WO2017/132358, filed Jan. 26, 2017, incorporated by reference herein. Briefly, cord lengths of about 30 cm can be used, although the cord may be cut into smaller sections, for example about 1 cm in length, about 2 cm in length, or about 3 cm in length, for easier handling and processing. It will be appreciated that larger or smaller tissue sections can be used, although it is desired to start the process with the highest number of initial cells as possible. Preferably, however, the umbilical cord sections are not minced into smaller pieces (0.2-0.5 mm). The cord or cords section(s) are preferably rinsed until no surface blood or blood clots are visible. Thus, although methods of the invention are particularly suited for processing whole tissues or whole tissue sections, without dissection or extraction of blood vessels from the umbilical cord tissue, it is preferred that tissues are adequately washed, e.g., with buffered sterile saline, before proceeding. Thus, "whole" tissues, according to the invention, denotes the fact that the umbilical cord interstitial and connective tissue remains intact along with its blood vessels characteristic of in vivo tissue, and is not decellularized, or otherwise disaggregated prior to being processed, with the understanding that the term "whole" is not intended to imply that a full and intact umbilical cord is necessarily processed. Indeed, the invention particularly contemplates processing smaller segments of umbilical cord in the method.

The tissue is then enzymatically and mechanically disrupted by contacting with a digestive solution for disaggregation of the tissue to break down the intercellular network and connective tissue in the cord and remove red blood cell contaminants. In certain preferred embodiments, a digestive enzyme solution is used. A variety of commercially available digestive enzyme solutions may be used. Exemplary digestive enzyme solutions include collagenase, hyaluronidase, DNase, elastase, papain, protease type XIV, and trypsin. In one or more embodiments, the digestive enzyme solution is a DNase-based enzyme solution, a collagenase-based enzyme solution, a hyaluronidase-based enzyme solution, or a mixture thereof. In one or more embodiments, trypsin is preferably omitted from the method. The tissue may be contacted with the digestive solution in a variety of containers to yield digested umbilical cord tissue. Preferably, the tissue is contacted with the digestive solution in a sterile container suitable for subsequent incubation. More preferably, the container is also suitable for subsequent mechanical agitation and dissociation. That is, an additional advantage of the technique is a closed processing system for disruption wherein digestion and dissociation to isolate the UC-MSCs occurs in the same container, so that opportunities for contamination are reduced. The umbilical cord tissue and digestive enzyme solution are incubated for a time period of less than about 10 hours, more preferably less than about 5 hours, even more preferably from about 2 to about 5 hours, and most preferably from about 3 to about 4 hours. It will be appreciated that the incubation time will depend upon the concentration of the digestive solution, as well as the temperature. The incubation is typically carried out at a temperature from about 30° C. to about 45° C., more preferably from about 35° C. to about 40° C., and most preferably about 37-39° C.

The digested umbilical cord tissue is also mechanically dissociated to physically break up the interstitial and connective tissue, blood vessels, and the like, and dislodge individual components of the tissue to yield a dissociated umbilical cord tissue solution comprising the UC-MSCs. The mechanical dissociation may be performed by hand, but may also be carried out, for example, using an automated dissociation and homogenization apparatus, such as MACS® by Miltenyl Biotec, or more preferably by a customized apparatus designed for the task, which sequentially carries out the incubation and dissociation process.

The UC-MSCs are then separated from the dissociated umbilical cord tissue solution. Various separation or isolation techniques can be used, including centrifugation, density gradient centrifugation, as well as filtering or sieving, to separate the UC-MSCs from remaining tissue debris and extracellular components, etc., including additional washing steps if necessary. The cells are then pelleted via centrifugation, and then resuspended in suspension medium comprising a quantity of culture medium and red blood cell lysing solution to remove red blood cell contaminants. Cells are mixed gently, e.g., by pipetting, and then centrifuged followed by resuspension of the cell pellet after the supernatant has been discarded. This process can be repeated as necessary to remove substantially all red blood cell contaminants before plating. In one or more embodiments, the isolated MSC population may include both stem cell and non-stem cell fractions. The cells are preferably suspended in a novel canine UC-MSC culture medium comprising (consisting essentially or even consisting of) Dulbecco's Modified Eagles Medium (DMEM), supplemented with about 10% fetal bovine serum (FBS), glutamine (e.g., Gibco™ GlutaMAX™, preferably about 1%), and fibroblast growth factor-basic (bFGF, Gibco™, aka FGF2, preferably about 10 ng/mL). In certain preferred embodiments, the medium further comprises an antibiotic-antimycotic component (~1%), which reduces contamination risk. The isolated cells are then plated onto a cell culture substrate, and preferably on an adherent substrate, at passage 0.

The methods further comprise expanding the isolated cells. Cells may be freshly isolated, or may have been cryopreserved (and thawed) prior to being subjected to the expansion procedures described herein. Details regarding cryopreservation of canine UC-MSCs are described infra.

In certain such embodiments, the isolated canine UC-MSCs are plated or seeded onto a cell culture substrate (e.g., flask, Petri dishes, multi-well plate, etc.). More preferably, an adherent substrate is used for culturing the UC-MSCs, such as tissue-culture treated plastic, or more preferably following surface treatment of the plastic. For example, the surface may be treated with cell adhesion molecules that interact with integrins, cadherins, selectins, et alia. Examples of surface treatment via cell adhesion molecules include a thin (≤1 μm, preferably ≤100 nm, preferably ≤50 nm, even more preferably from about 20 nm to about 50 nm in thickness) coating of one or more of the following: gelatin, laminin, fibronectin, poly-lysine, vibronectin, collagen, fibrin and/or other natural or artificial substances that contain cell surface binding properties, or combinations of cell adhesion molecules. In other embodiments, the surface treatment includes physical modification to change the surface charge, wettability/hydrophilicity, stiffness, roughness or other physical/chemical qualities of the surface. In this regard, the plastic surface may be etched, for example by exposure to plasma, laser illumination, gamma radiation, or oxidizing agents. In other embodiments, the cells are encapsulated in a biocompatible matrix that supports three-dimensional growth of cells within suspension. In this regard, the cells may be suspended in a matrix, such a matrix may be comprised of extracellular matrix components (ECM), et alia. Examples of ECM are known in the art, such as Matrigel, or similar natural or synthetic matrices comprised of peptides, for example, PepGel™ (peptide hydrogel matrix) or fibrin, or hybrids of both natural and synthetic matrices. It will be appreciated that the application of surface treatment modification for the purpose of enhancing cell attachment is not limited to canine MSCs, as in the present embodiment, and has application to other cell types or tissues or organoids in 2D or 3D culture. Regardless, cells are placed on the prepared substrate or within the matrix with the above-described media warmed to about 35° C. to about 40° C. (preferably about 37-39° C.). The cells can be plated at a density of at least about 20,000 live cells per $cm^2$ on the substrate. After plating or seeding, the UC-MSCs are incubated, preferably at a temperature of from about 30° C. to about 45° C., more preferably from about 35° C. to about 40° C., and most preferably about 37-39° C. The cells are generally allowed to incubate until the culture achieves at least about 70% confluency (preferably from about 80% to about 90% confluency), replacing about half of the culture media with fresh media every few days.

The cells are then transferred to a second cell culture substrate. Preferably, a cell dissociation reagent is used to detach the cells from the first adherent substrate to facilitate the transfer. That is, before being transferred to the second cell culture substrate, the UC-MSC monolayer(s) must first be detached or lifted from the adherent surface and ideally dissociated into individual cells or smaller aggregates for subsequent passage/plating. For example, enzyme-based dissociation reagents, such as trypsin and/or collagenase are often used. Enzyme-free reagents or chemical dissociation reagents (e.g., EDTA) are also available. In certain preferred embodiments, the dissociation reagent for use in the inventive method is a serine protease enzyme extracted from *natto*, the fermentation product produced by fermenting boiled soybeans with *Bacillus subtilis* var *natto* (referred to as nattokinase), and recombinant and batch-produced forms of nattokinase have been reported. Use of nattokinase as a cell dissociation reagent to dislodge adherent cells has been found to improve viability and passaging potential of cells and surface markers. A nattokinase solution for use as a cell dissociation reagent is prepared by dispersing nattokinase powder (with an enzyme activity of preferably at least 2,000 FU) into solution. Thus, embodiments of the invention are further concerned with a gentle enzymatic detachment of cells from a substrate surface or liberation of cells from a 3D matrix to maximize cell viability and minimize cell damage or cell surface modification by contacting cells cultured on a substrate surface with nattokinase. Further, embodiments of the invention include kits for application in tissue culture for the enzymatic detachment of cells or dissociation from a substrate surface or liberation from a 3D matrix comprising a nattokinase solution and instructions for use, or application of nattokinase as an enzymatic disruption agent for isolation of cells from tissues or from tumors. A further advantage of this technique is that unlike trypsin or other conventional dissociation reagents, nattokinase does not impair or interfere with subsequent analytical techniques, such as flow cytometry where trypsin has been shown to degrade antigens and/or antibodies in the reaction solution. It will be appreciated that the use of nattokinase solutions is not limited to canine UC-MSCs, but could be utilized as an enzymatic dissociation reagent for a wide variety of applications, and is not limited to adherent cell types where cultured cells need to be detached from the substrate surface, and may aid in the liberation of cells from within 3D matrices, organoids, tissues or tumors.

Regardless of the embodiment, the detached UC-MSCs cells are then pelleted by low speed centrifugation, followed by resuspension of the pellet once the supernatant has been discarded. Fresh media is then used to plate the cells on the second substrate having the above-described adherent surface at a cell density of about 10,000 to about 50,000 cells/cm$^2$, but preferably at least about 20,000 cells/cm$^2$. This incubating-transfer (passaging) procedure may be performed for multiple passages until the desired cell yield is achieved. This method is capable of achieving significantly higher cell viability and higher numbers of passages without senescence over prior art methods. It will be understood that a combination of different substrate types may be used in the methods described herein (i.e., cells in a plate may be transferred to a flask, and cells in a flask may be transferred to a microplate or dish, etc.). Using the aforementioned protocol, canine UC-MSCs can be passaged at least 5 times, preferably at least 7, more preferably at least 10 times without senescence (i.e., without losing multipotent progenitor characteristics, such as morphology, self-renewal capacity, surface marker expression, and differentiation capability). In one or more embodiments, the passaging protocols of the invention are preferably carried out without trypsin (e.g., trypsin, trypsin-EDTA) or trypsin-replacement reagents (Gibco™ TrypLE, recombinant fungal trypsin-like protease).

The expanded cells may be used in a variety of ways, including for in vitro cell culture, analytical methods (e.g., RT-PCR, PCR, flow cytometry, including fluorescence-activated cell sorting (FACS), ELISA, metabolic assays such as MTT, XTT, WST-1, et alia), or as biotherapeutics (allogeneic transplants, tissue engineering, encapsulation in biocompatible matrices, production of extracellular vesicle, et alia), and the like. The cells can also be further processed by subjecting them to protocols for differentiation into for example, either osteogenic, chondrogenic, or adipogenic cell lineages, or used for the production of induce pluripotent stem cells (iPSCs). Thus, canine UC-MSCs are also described herein for use in in vitro production of osteoblasts, chondrocytes, and/or adipocytes, or for in vitro production of induce pluripotent stem cells, or for the in vitro production of extracellular vesicles.

Embodiments of the invention are also concerned with analytical methods and kits for standardized characterization of canine UC-MSCs, including a standardized panel of antibodies for canine UC-MSCs cell surface markers. Such markers can also be used as part of methods and techniques for enriching canine UC-MSCs from cell populations, increasing the purity of canine UC-MSCs from cell culture, cell sorting, and/or confirmation of identity of isolated canine UC-MSCs from cell culture.

In one or more embodiments, a kit comprising a standardized panel of antibodies is provided for cell surface markers: CD5, CD11b, CD21, CD14, CD34, CD44, CD45, CD73, CD90, and/or CD105. Preferably, the panel includes at least two (preferably at least three, more preferably at least four, more preferably at least five, even more preferably at least six) of the following: anti-CD34 antibody (preferably clone 1H6), anti-CD44 antibody (preferably clone IM7), anti-CD73 antibody (preferably clone 7G2), anti-CD90 antibody (preferably clone 5E10-), anti-CD105 antibody (preferably clone OTI8A1), anti-CD5 antibody (preferably clone YKIX716.13), anti-CD11b antibody, anti-CD14 antibody (preferably clone TUK4), anti-CD21 antibody, and anti-CD45 antibody, or a functional fragment thereof. Preferably, the panel includes at least two (preferably at least three, more preferably at least four, even more preferably all five) of the following: anti-CD34 antibody (preferably clone 1H6), anti-CD44 antibody (preferably clone IM7), anti-CD73 antibody (preferably clone 7G2), anti-CD90 antibody (preferably clone 5E10-), anti-CD105 antibody (preferably clone OTI8A1), or a functional fragment thereof. As used herein a "functional fragment" of the antibody means a fragment that retains the antigen binding function, such that the fragment still exhibits binding specificity for the target surface antigen.

In one or more embodiments, CD34+, CD44+, CD73+, CD90+, and/or CD105+ cells can be sorted and recovered using flow cytometry from a cell population or culture containing canine UC-MSCs. Such cells may be further characterized as CD5−, CD11b−, CD14−, CD21−, and/or CD45−. Thus, the resulting cell product is highly enriched in canine UC-MSCs having high viability, multipotent potential for differentiation into osteoblasts, chondrocytes, or adipocytes, as well as increased colony-forming units-fibroblast efficiency. It will be appreciated that other cell selection methods may be used instead of flow cytometry if desired, such as magnetic beads or affinity chromatography.

Thus, methods of the invention further comprise preparing a cell population from umbilical cord tissue comprising dissociated canine MSCs, and selecting for CD34+, CD44+, CD73+, CD90+, and/or CD105+ cells, which are not expressing CD5, CD11b, CD14, CD21, and/or CD45. Such selection is generally based upon identifying/capturing/isolating cells that have bound (or have not bound) to one or more antibodies incubated with the cell population. Thus, it will be appreciated that antibodies for use in the methods may include detectable labels or tags to facilitate identification and/or capture. Microfluidics devices can also be used.

Embodiments of the invention also include kits comprising the above-described characterization panels for selecting and/or verifying canine UC-MSCs using a variety of suitable surface marker selection instruments. Such kits may include additional reagents and instructions as noted above for analysis of cell samples, or for differentiation of the collected cells (e.g., reagents and instructions for osteogenesis and confirmation, chondrogenesis and confirmation, and/or adipogenesis and confirmation).

Isolated canine UC-MSCs can also be subjected to cryopreservation before and/or after one or more passages as described above. It has been found that the freeze-thaw technique described herein reduces cryo damage to the canine UC-MSCs, which are otherwise very sensitive to cryopreservation. For cryopreservation, the isolated canine UC-MSCs are dispersed in the novel canine UC-MSC culture medium described above, along with a DMSO-based cryoprotectant solution (typically in a 1:1 ratio). Particularly preferred cryoprotectant solutions include 3-10% DMSO, along with one or more supplements. A standard controlled rate freezing protocol can then be used to cryopreserve the cells in solution. Likewise, a standard warming bath protocol can be used to thaw the cells. Importantly, upon thawing and rinsing/removal of the cryoprotectant, the cells are preferably plated onto an adherent substrate after thaw in culture medium. This strategy permits at least 70%, preferably at least 75%, preferably at least 80%, preferably at least 85%, more preferably at least 90%, even more preferably at least 93%, and even more preferably at least 95% post-thaw viability in the cells. More importantly, the cells are stable, such that the improved post-thaw viability is maintained over longer periods of cryostorage. That is, cells maintain at least 70%, preferably at least 75%, preferably at least 80%, preferably at least 85%, more preferably at least 90%, even more preferably at least 93%, and even more preferably at least 95% post-thaw viability after 6 months or more cryopreservation, and even more than 1 year of cryopreservation.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth experiments for isolating and expanding UC-MSCs. It is to be understood, however, that these examples are provided by way of illustration and nothing therein should be taken as a limitation upon the overall scope of the invention.

A Protocol for the Isolation, Culture, and Cryopreservation of Umbilical Cord-Derived Canine Mesenchymal Stromal Cells: Role of Cell Attachment in Long-Term Maintenance Here, a stepwise process was used to optimize canine MSCs isolation, expansion, and cryopreservation utilizing canine umbilical cord-derived MSCs. The culture protocol utilizes coating of tissue culture surfaces that increases cellular adherence, increases colony-forming units-fibroblast efficiency, and decreases population doubling times. Canine MSCs isolated with our protocol could be maintained longer than published canine MSCs methods before senescing. Our improved cryopreservation protocols produce on average >90% viable MSCs at thaw. These methods enable master-bank and working-bank scenarios for allogeneic MSC testing in naturally occurring disease in dogs.

Introduction

We and others have isolated human UC-MSCs, cryogenically banked, and expanded the cells for potential therapeutic applications. For regenerative medicine applications, UC-MSCs might be preferred to adult tissue-derived MSCs due to age-related or disease-related changes that affect MSCs. UC-MSCs are in human clinical testing both in the US and abroad (clinicaltrials.gov website, accessed March 2019). UC-MSCs have been successfully isolated from veterinary species including: swine, cattle, goats, horses, and canines. The literature reveals that the efficiency of UC-MSC isolation and expansion differs between species and laboratories. The lack of reproducibility is a source of concern in the MSC field.

Many factors affect the efficiency to generate MSCs. These factors include isolation method, donor pool, efficiency (cell yield per donor), expansion potential of isolated cells, medium formulation, cell plating density, passaging protocol, cryopreservation efficiency, characterization procedures, senescence, and thawing procedure. Based upon the lack of consistency in manufacturing between laboratories, we suggest that MSC protocols need to be both optimized and standardized.

Many common human genetic disorders and many naturally occurring diseases in humans have canine homologs, adding to the importance of canines as a model for human disease. Additionally, canines are an important model species for human anatomical injuries, especially those involving large joints. Canine MSCs have been used as an experimental treatment for orthopedic injuries and show positive clinical results in pilot studies. A recent uncontrolled, non-blinded clinical trial in 22 dogs indicated the safety and efficacy of neonatal MSCs in canines with arthritis over a two-year follow-up period. Canine MSCs are under-represented in the scientific literature compared to human and rodent MSCs (PUB MED search 11 Feb. 2019 search terms MSCs and (canine or dog)=317; MSCs and human=13070; MSCs and (rat or mouse)=8821).

Here, barriers that impede canine MSC testing are addressed. First, canine MSCs are more difficult to expand in culture or undergo senescence at or before passage 6, with a few groups surpassing 6 passages. Second, a consensus set of canine MSC antibodies for characterization has not been established. Having a standardized panel of monoclonal antibodies for cell surface markers: CD105, CD44, CD73, CD90, DLA class I and II, CD31, CD45 and CD34 would constitute a minimal set of MSC characterization antibodies. Third, tri-lineage differentiation has been demonstrated by some groups, but not by other groups, which suggests that standardized osteogenic, chondrogenic and adipogenic differentiation protocols for MSCs are needed.

As we provided for human UC-MSCs, here we provide protocols for isolation, expansion, and characterization for canine UC-MSCs. Standardizing protocols may improve the ability to compare results across laboratories and enable clinical translation. Our methods provide healthy, viable canine MSCs that can be cryopreserved, thawed, and expanded. The characterization standards for canine MSCs provided here are not comprehensive. However, the protocols provided here remove key barriers and thus, enable canine UC-MSCs research.

Materials and Methods

Umbilical Cord Collection—Canine umbilical cords donated after Cesarean-section births with owner informed-consent were used. Briefly, the dam was anesthetized and placed in lateral recumbence; the abdomen was shaved and surgically prepared for a lateral celiotomy approach to the uterus. The uterus was exteriorized, a single hysterotomy was made, and the pups delivered. The umbilical cords were separated from the placenta and placed in a sterile transport media made from an isotonic, neutral buffered solution supplemented with 1% antibiotic-antimycotic (Gibco, Catalog No. 15240062) and placed into a 4° C. refrigerator. Cords were kept in a styrofoam cooler during transport. Once received in the laboratory, cords were refrigerated at 4° C. until processing. All cords were processed within five days of birth. Donor breed information was recorded when provided by the clinic but is not evaluated here.

Gelatin Coating of Tissue Culture Plastic—A solution of 0.1% w/w porcine skin gelatin (Sigma Aldrich, Catalog No. G2500-100G) dissolved in distilled water was sterilized and cooled before use. Gelatin solution was added to the flask or well and swirled for 10-15 seconds. Gelatin was removed and the plate or flask was air-dried in the biological safety cabinet (BSC). The dried plates were sealed tightly and stored refrigerated until use, or they were used immediately after drying.

Isolation—Umbilical cords were collected from an entire litter and litter size was not considered as a variable. In contrast to human cords, puppies' cords have a complex vascular structure that arborizes making it difficult to determine the vascular material of an individual. Furthermore, the umbilical cords from littermates were intertwined within the fetal adnexa tissue. The cords were stripped away from the adnexa without stretching or ripping, and pooled then the length was measured for a desired amount per tube. Processing of umbilical cords and trimming was performed in the BSC. The cords were rinsed repeatedly in 37° C. Dulbecco's Phosphate Buffered Saline (DPBS) containing 1% antibiotic-antimycotic (1% A/A, Gibco, Catalog No. 14-190-250; Gibco, Catalog No. 15-240-062). The cord length was measured and it was cut into 0.25 cm sections then transferred into a C-tube (Miltenyi Biotech, Catalog No. 130-096-334) containing 10 mL of 37° C. enzyme solution. The length of umbilical cord placed in each C-tube was recorded and classified into less than 30 cm or more than 30 cm length. The enzyme solution contained 1 mg/mL hyaluronidase (MP Biomedicals, Catalog No. 02151272), 300 units/mL collagenase type I (Life Technologies, Catalog No. 17-100-017), and 300 units of deoxyribonuclease I (Sigma Aldrich, Catalog No. D4263-5VL) in Hank's Balanced Salt Solution (HBSS, Corning, Catalog No. MT21021CM). The cord tissue weight was estimated by subtracting the weight of the C-tube with enzyme from the weight of the tube containing the enzyme and the umbilical cords. The C-tubes were processed in a GentleMACS Dissociator (Miltenyi Biotech, Catalog No. 130-093-235) using standard program "C", once. The C-tubes were centrifuged at 200 g for 5 minutes, then incubated at 37° C. on a Pelco R2 rotator with a 1051 sample platform at 12 rpm for three hours. Next, the C-tubes were processed using the GentleMACS Dissociator standard program B, once, and the solution was filtered (100 µm cell strainer, Fisherbrand, Catalog No. 22-363-549). Filter was washed with an additional 5 mL of DPBS with 1% A/A solution.

The cells were pelleted by centrifugation (200 g for 5 minutes, room temperature), and the supernatant was discarded. Red blood cells (RBC) were lysed by re-suspending the cells in 0.5 mL of culture media and addition 0.5 mL of lysing buffer (Hybri-Max, Sigma Aldrich, Catalog No. R7757-100ML). Cells were mixed by gentle pipetting for 60 seconds then diluted with 8 mL of DPBS with 1% A/A solution. Cells were pelleted by centrifugation (200 g for 5 minutes, room temperature), and the supernatant was discarded. Cell pellet was re-suspended in 1 mL of 37° C. ACB culture medium (recipe provided below). An aliquot was removed for live/dead cell count using acridine orange/propidium iodide (AOPI) staining solution (Nexcelom Bioscience, Catalog No. CS2-0106-5ML), on a Nexcelom Auto 2000 Cellometer (immune cells, low RBC program). Cells were plated at a density of 20,000-30,000 cells/cm$^2$ on the gelatin-coated tissue culture T-75 flasks (Corning, Catalog No. 7202000) in ACB culture medium (ACB consists of Dulbecco's Modified Eagles Medium (DMEM, high glucose, Gibco, Catalog No. 11-965-092) supplemented with 10% fetal bovine serum (HyClone, GE Healthcare Life Sciences, Catalog No. SH3007103), 1% antibiotic-antimycotic (Gibco, Catalog No. 15240096), 1% Glutamax (Gibco, Catalog No. 35-050-061), with or without 10 ng/mL fibroblast growth factor-basic (bFGF, Gibco, Catalog No. PHG0264).

Culture—After the first passage, canine UC-MSCs were plated at 20,000 cells/cm$^2$ on tissue culture plates or flasks (with or without prior gelatin-coating) using ACB cell culture media warmed to 37° C. The cells were grown at 37° C., 5% $CO_2$, condensing humidity in a Heracell 150i or Nuaire AutoFlow 4950 incubator. Half of the volume of media was replaced every 3 days until the cells reached 80-95% confluency before passage. Canine UC-MSCs were lifted with either TrypLE Express (Gibco, Catalog No. 12605028) or 1.75% Nattokinase (Bulk Supplements, Catalog No. NATT100) for 30 minutes at 37° C. Cells were dislodged with gently tapping to completely remove them from the plate. If few cells remained adherent to the plate, an additional 5 minutes of incubation was used. Detached MSCs were collected and pelleted by centrifugation (200 g for 5 minutes at room temperature). The supernatant was discarded and the cell pellet was re-suspended in 1 mL of fresh, warm ACB medium. A live/dead cell count was performed at passage, and the cells were either plated in fresh medium on gelatin-coated plates at a density of 20,000 cells/cm$^2$ or cryopreserved, or discarded. Population doubling time was calculated from the following formula:

$$\text{Population Doubling Time} = \frac{\text{Duration of Culture (days)} \times \log(2)}{\log(\text{final cell count}) - \log(\text{initial cell count})}$$

Cryopreservation—To cryopreserve, UC-MSCs were suspended in 1:1 v/v ratio of ACB cell culture medium and freezing medium (Human Embryonic Stem Cell Cryopreservative, MTI-GlobalStem) at 0° C. MSCs were kept ice cold and immediately transferred to a controlled-rate freezing apparatus (Mr. Frosty) and then onto the bottom shelf of a −80° C. freezer. After 24 hours, the vials were moved to the vapor phase of liquid nitrogen tank for long-term storage.

Figure 14:
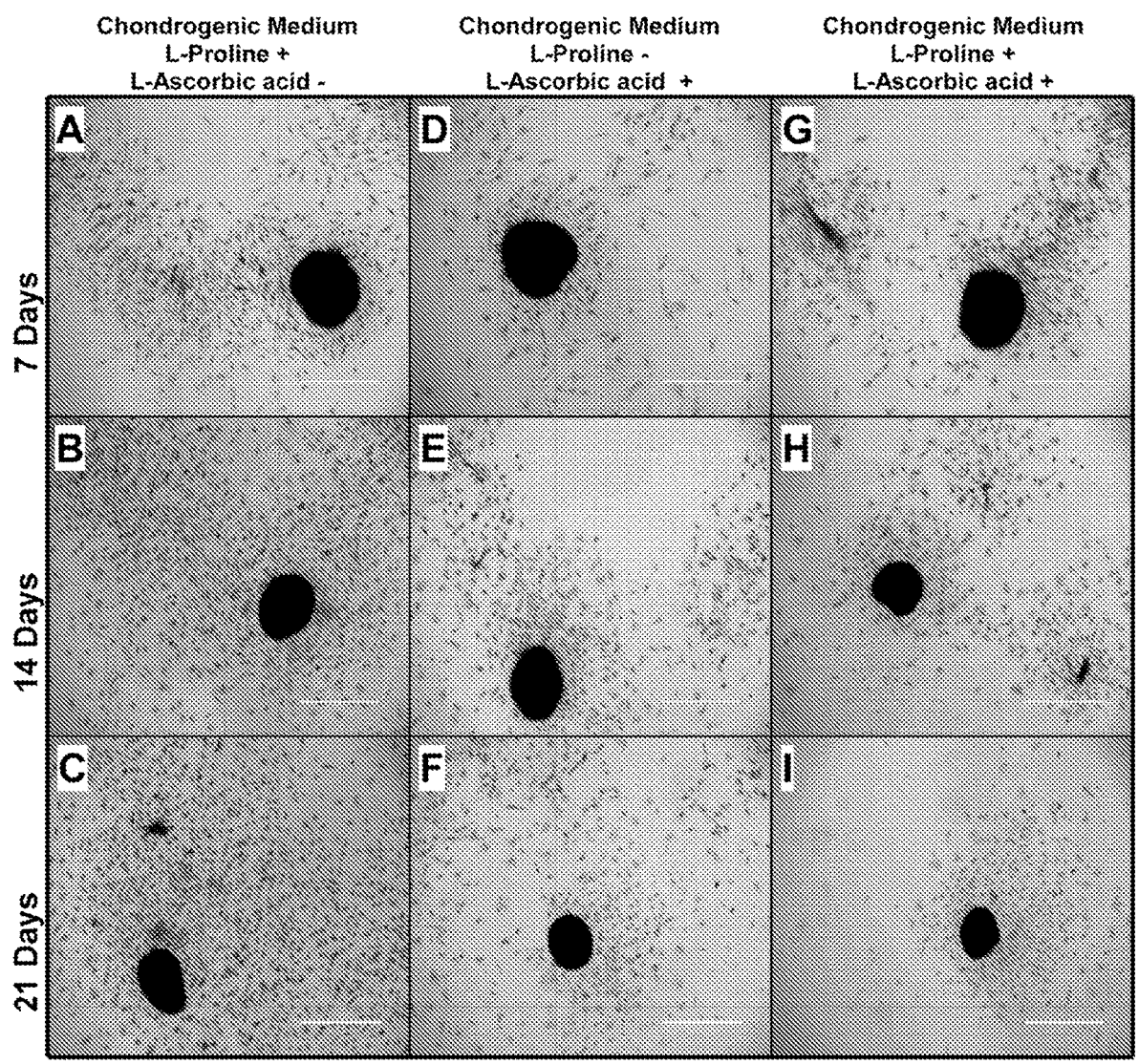
FIG. 14 shows cell staining images of chondrogenic medium selection using canine mesenchymal stromal cells (MSCs, line 30 at passage 5). Three different media conditions compared after 7 (A, D, G), 14 (B, E, H) or 21 (C, F, I) days of differentiation. A-C. Chondrogenic differentiation medium with 40 mg/mL L-proline and no L-Ascorbic acid 2-phosphate (L-Ascorbic acid). D-E. Chondrogenic differentiation medium with 50 mM L-Ascorbic acid and no L-proline. G-I. Chondrogenic differentiation medium with 40 mg/mL L-proline and 50 mM L-Ascorbic acid. Note that micro-masses or aggregates of cells form and stain intensely. Note that prominent staining is seen in all media conditions tested, even after only 7 days of differentiation. Safranin O staining for acidic proteoglycans (cartilage) after fixation. Calibration bar equals 1000 mm. Representative wells from technical duplicates.
Figure 15:
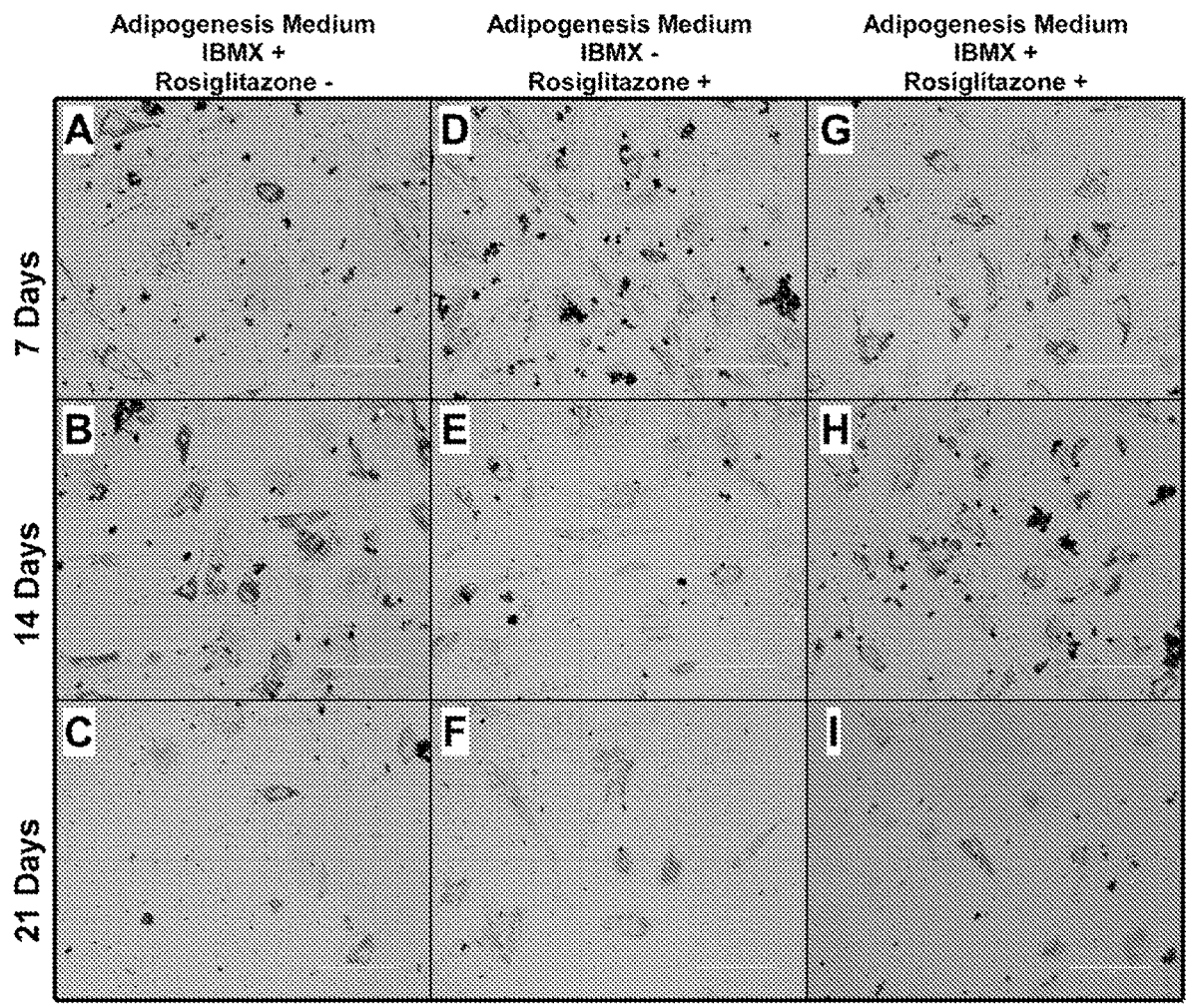
FIG. 15 shows images from adipogenic differentiation media selection using canine mesenchymal stromal cells (MSCs, line 30 at passage 5). Three different media conditions compared after 7 (A, D, G), 14 (B, E, H) or 21 (C, F, I) days of differentiation. A-C. Adipogenic differentiation medium with 0.5 mM 3-Isobutyl-1-methylxanthine (IBMX) and no Rosiglitazone. D-E. Adipogenic differentiation medium with 5 mM Rosiglitazone and no IBMX. G-I. Adipogenic differentiation media with 0.5 mM IBMX and 5 mM Rosiglitazone. Note that MSC loss is seen in all three differentiation media over time. The most prominent lipid staining is seen when using adipogenic medium containing 0.5 mM IBMX and no Rosiglitazone at 7 and 14 days of differentiation (see panels A and B). Oil Red O staining for lipid droplets after fixation. Calibration bar equals 200 mm. Representative wells from technical duplicates.
Figure 16:
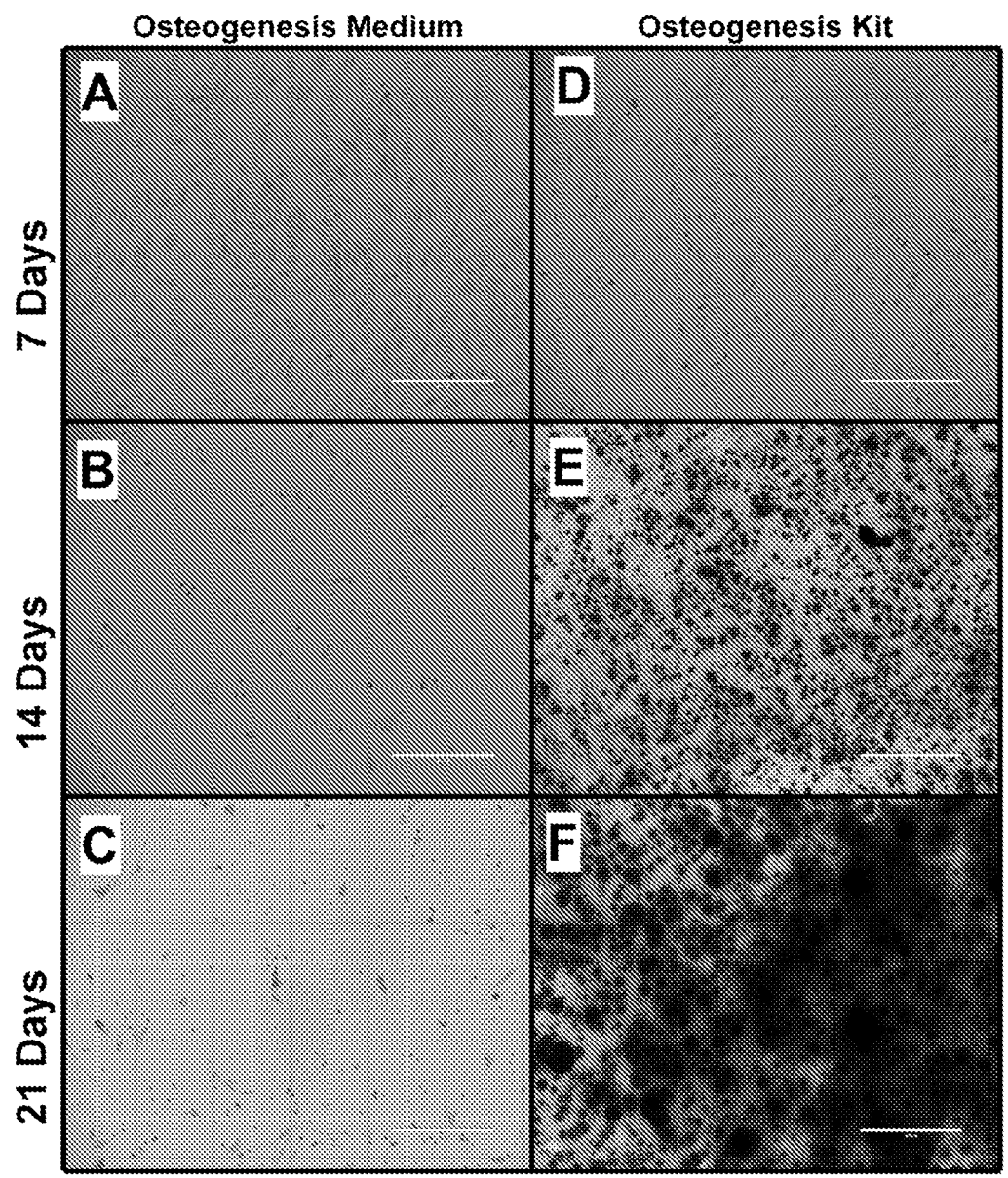
FIG. 16 shows images from osteogenic differentiation medium selection using canine mesenchymal stromal cells (MSCs, line 30 at passage 5). Two different media conditions compared after 7 (A, D), 14 (B, E) or 21 (C, F) days of differentiation. A-C. Osteogenic differentiation medium made in the laboratory (see text). D-F. Osteogenic differentiation medium from the MSC differentiation kit. Note that using the osteogenic differentiation medium from the kit yields robust staining, and that matrix deposition was observed after 14 days and intensified over the next week. In contrast, the medium made up in the laboratory resulted in MSC loss and very poor deposition of matrix. Alizarin Red S staining for calcium deposition after fixation. Calibration bar equals 400 mm. Representative wells from technical duplicates.

Tri-lineage Differentiation—UC-MSCs between passages 7-10 were differentiated to chondrogenic, osteogenic, and adipogenic lineages. The results of that testing can be found in FIG. 14 for chondrogenic differentiation, FIG. 15 for adipogenic differentiation and FIG. 16 for osteogenic differentiation. We tested 3 different media for chondrogenic, 3 different media for adipogenic and 2 different media for osteogenic, as noted in the Tables below.

TABLE 1

Chondrogenesis Conditions
Seeding: 200,000 cells/well in 2D micromass
Differentiation Time: 7, 14, and 21 Days

| I. | II. | III. |
|---|---|---|
| DMEM, high glucose | DMEM, high glucose | DMEM, high glucose |
| 1% Penicillin-Streptomycin | 1% Penicillin-Streptomycin | 1% Penicillin-Streptomycin |
| 10 ng TGF-B1 | 10 ng TGF-B1 | 10 ng TGF-B1 |
| 1% Fetal bovine serum | 1% Fetal bovine serum | 1% Fetal bovine serum |
| 100 nM Dexamethasone | 100 nM Dexamethasone | 100 nM Dexamethasone |
| 1 mM Sodium pyruvate | 1 mM Sodium pyruvate | 1 mM Sodium pyruvate |
| 40 µg L-Proline | 50 mM Ascorbic acid-2-phosphate | 40 ug L-Proline |
|  |  | 50 mM Ascorbic acid-2-phosphate |

TABLE 2

Adipogenesis Conditions
Seeding: 50,000 cells/well
Differentiation Time: 7, 14, and 21 Days

| I. | II. | III. |
|---|---|---|
| DMEM, high glucose | DMEM, high glucose | DMEM, high glucose |
| 1% Penicillin-Streptomycin | 1% Penicillin-Streptomycin | 1% Penicillin-Streptomycin |
| 5% Rabbit serum | 5% Rabbit serum | 5% Rabbit serum |
| 100 nM Dexamethasone | 100 nM Dexamethasone | 100 nM Dexamethasone |
| 200 µM Indomethacine | 200 µM Indomethacine | 200 µM Indomethacine |
| 10 µM Insulin | 10 µM Insulin | 10 µM Insulin |
| 0.5 mM 3-Isobutyl-1-methylxanthine (IBMX) | 5 µM Rosiglitazone | 0.5 mM 3-Isobutyl-1-methylxanthine (IBMX) |
|  |  | 5 µM Rosiglitazone |

TABLE 3

Osteogenesis Conditions
Seeding: 40,000 cells/well
Differentiation Time: 7, 14, and 21 Days

| I. | II. |
|---|---|
| DMEM, high glucose | StemPro Osteogenesis Differentiation Kit according to manufacturer's instructions |
| 1% Penicillin-Streptomycin |  |
| 10% Fetal bovine serum |  |
| 100 nM Dexamethasone |  |
| 50 µM Ascorbic acid-2-phosphate |  |
| 10 mM β-glycerophosphate |  |

Figure 8:
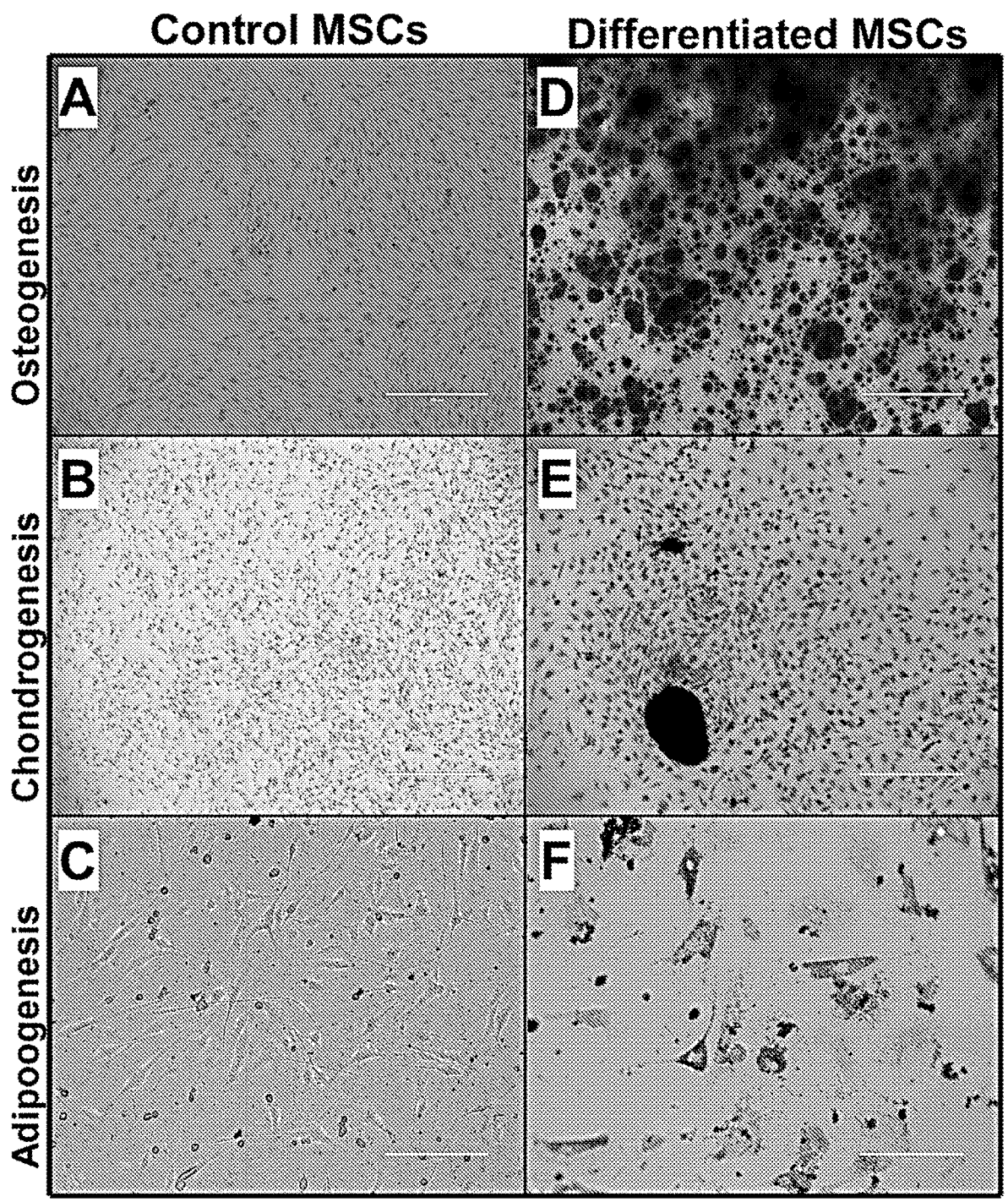
FIG. 8 shows images from trilineage differentiation experiments with canine mesenchymal stromal cells (MSCs, line 30 at passage 5). A-C. Negative control (Control MSCs): MSCs in normal culture medium and stained to demonstrate background levels of calcium deposition using Alizarin Red S (panel A, for osteogenic differentiation), acidic proteoglycan staining using Safranin O (panel B, for chondrogenic differentiation), and lipid droplets using Oil Red O (panel C, for adipogenic differentiation). D-F. MSCs after trilineage differentiation (Differentiated MSCs). Calcium matrix deposition after 21 days of osteogenic differentiation (panel D). MSC micromasses form and stain intensely for acidic proteoglycans after 14 days of chondrogenic differentiation (panel E). Lipid droplets within MSCs after 14 days of adipogenic differentiation (panel F). In all cases, staining was performed after fixation. Representative wells shown from technical duplicates. Calibration bar is 400 mm in panels A and D, 1000 mm in panels B and E, and 200 mm in panels C and F.

The formulations for FIG. 8 were: DMEM, high glucose, 1% antibiotic-antimycotic, 10 ng TGF-B1 (Sigma, Catalog No. GF346), 1% Fetal Bovine Serum, 100 nM Dexamethasone (Sigma, Catalog No. D4902), 1 mM sodium pyruvate (Gibco, Catalog No. 11360070), 40 ug L-Proline (Sigma, Catalog No. P8865) for 21 days for chondrogenesis; DMEM, high glucose, 1% antibiotic-antimycotic, 5% Rabbit Serum (Vector Labs, Catalog No. S-5000), 100 nM Dexamethasone, 200 uM Indomethacin (Sigma Catalog No. I7378), 10 uM insulin (Gibco, Catalog No. 12585014), 0.5 mM 3-Isobutyl-1-methylxanthine (IBMX, Sigma, Catalog No. I7018) exposure for 14 days for adipogenesis; and StemPro osteogenesis differentiation kit (ThermoFisher, StemPro, Catalog No. A1007201) using manufacturer's protocol for 21 days for osteogenesis.

Briefly, 12 well gelatin-coated plates (CytoOne, Catalog No. CC7682-7512) were used to plate UC-MSCs in triplicate at a lineage-specific density. A density of 200,000 cells per well was used for chondrogenesis, 20,000 cells per well for osteogenesis, and 76,000 cells per well for adipogenesis. Half the volume of medium was replaced every 3 days. After 25-30 days of differentiation, medium was removed and cells were washed using DPBS with calcium and magnesium (Gibco, Catalog No. 14040-133). The cells were fixed with freshly prepared 4% paraformaldehyde in 10 mM phosphate buffer (pH 7.4) for 30 minutes at room temperature, and then triple washed with DPBS. MSCs were stained with Oil Red O to visualize lipid droplets in adipocytes (Sigma Aldrich Catalog No. HT904-8F0Z), or with Alizarin Red S to detect calcium crystal in osteocytes (Sigma Aldrich Catalog No. A5533-25G), or with Safranin O to visualize sulfated glycosaminoglycans in chondrocytes (Sigma Aldrich, Catalog No. O0625-100G). Following staining, brightfield images were captured using an Evos FL Auto microscope (Life Technologies).

CFU-F Assay—Canine UC-MSCs were plated at 50, 100, and 500 cells per $cm^2$ in triplicate on gelatin-coated 6-well tissue culture plates (CytoOne, Catalog No. CC7682-7506) in ACB medium and incubated undisturbed for at least three days. The medium was changed every 3 days. Cells grew 10-14 days prior to fixation with ice-cold 100% methanol for 15 minutes. Methanol was removed and the plates were washed twice for 5 minutes with room temperature, sterile Sorenson's Phosphate Buffered Saline (pH 7.4). The colonies were then stained with 1% w/v aqueous methylene blue for 20 minutes at room temperature, gently washed three times with distilled water, and air-dried overnight. The colonies were counted manually using 4-10× magnification. Colonies were defined as "clonal" groups consisting of ≥10 cells. The number of colonies per well was averaged from the technical triplicates at each plating density. By dividing the number of cells plated by the averaged colony number, the colony forming efficiency was calculated.

Flow Cytometry—Flow cytometry analysis of canine UC-MSCs was adapted from the human UC-MSC protocol we have previously published. All antibody clones were previously tested for their use in immunophenotyping canine MSCs (see Table 4) or are in routine use by the Kansas State University Veterinary Diagnostic Flow Cytometry core for canines. In brief, UC-MSCs were cultured until 90-95% confluent, passaged using 1.75% nattokinase, and reconstituted in blocking buffer containing 1% bovine serum albumin (BSA). An aliquot was removed for viability and cell count while the remainder of the cells incubated in blocking buffer for 15 minutes at 4° C. Canine UC-MSCs were centrifuged (200 g for 5 minutes at room temperature) and reconstituted in 1% BSA with the addition of primary antibody at a dilution of 1:100 (see Table 5). Canine UC-MSCs were incubated for 1 hour at 4° C. protected from light, washed, and centrifuged. If antibody was unconjugated then secondary antibody was added to 1% BSA at a concentration of 2 µg/mL and incubated at 4° C. for 30 minutes protected from light. Finally, cells were washed with 1% BSA and resuspended in 500 µL 1% BSA and stored at 4° C. protected from light until ran on cytometer.

TABLE 4

Antibody clone

| Marker | Clone | Our Results |
| --- | --- | --- |
| CD105 | OTI8A1 | Positive |
| CD105 | SN6 | Negative |
| CD105 | P3D1 | Negative |
| CD73 | D12 | Negative |
| CD73 | AD2 | Negative |
| CD73 | 7G2 | Positive |
| CD34 | 1H6 | Positive |
| CD44 | IM7 | Positive |
| CD45 | YKIX716.13 | Negative |
| CD90 | 5E10- | Positive |
| CD14 | TUK4 | Negative |

MSCs, incubated for 30 minutes at 37° C., and washed with DPBS. UC-MSCs were resuspended in DPBS, 50 µg/mL of propidium iodide (PI) (Invitrogen, Cat. No. P3566) was added, and cells were stored at 4° C. protected from light until ran on cytometer.

The prepared samples were run on a BD LSR Fortessa X-20 SORP flow cytometer (BD Biosciences, San Jose, Calif.) equipped with 405, 488, 561, and 633 nm lasers and appropriate filters to detect all fluorophores listed in Table 5. Data was acquired, recorded, and analyzed utilizing BD FACSDiva 8.0 software (BD Biosciences). For multicolor labeled samples the compensation matrix was calculated by the software from individually labeled UltraComp eBeads (ThermoFischer Scientific, Waltham, Mass.) and applied to the cell sample prior to data acquisition. Cells were identified by forward and side scatter properties and used as the primary gate to exclude debris and doublets. Unstained cells established background fluorescence and acted as a negative control for cell surface markers. At least 10,000 gated data points were recorded for all samples. Results were generated by overlaying the appropriate fluorescence channel of unlabeled and labeled cell samples. For DNA analysis cells were identified by setting the detection threshold to be based off fluorescence in a 610/20 bandpass filter which would identify only propidium iodide stained cells. Positively identified cells were gated using pulse geometry to not only exclude doublets but also reveal the presence, if any, of cells with aberrant DNA content. A histogram was generated from the aforementioned gate for cell cycle analysis.

Reverse transcriptase-polymerase chain reaction (RT-PCR)—RT-PCR was conducted as previously described. Briefly, total RNA was isolated using an RNeasy kit (Qiagen). RNA was treated with DNase before storage and measured using a NanoDrop spectrophotometer. Complementary DNA was synthesized from total RNA using Superscript III First-Strand Synthesis Supermix kit (Invitrogen) primed with oligo-dT 12-18 per the manufacturer's protocol. Polymerase chain reaction (PCR) was performed using a BioRad iCycler: the initial denaturation at 95° C. for 3 min,

TABLE 5

Antibodies tested in Flow Cytometry

| Antibody | Clone | Fluorophore | Catalog Number |
| --- | --- | --- | --- |
| CD5 | YKIX322.3 | PerCP-eFluor 710 | 46-5050-42 |
| CD11b | M1170 | V450 | 560456 |
| CD14 | TUK4 | Alexa Fluor® 700 | MCA1568A700 |
| CD21 | CA2.1D6 | Alexa Fluor® 647 | MCA1781A647 |
| CD34 | 1H6 | PE | 12-0340-42 |
| CD44 | IM7 | BV786 | 563736 |
| CD45 | YKIX716.13 | Alexa Fluor® 488 | MCA1042F |
| CD73 | 7G2 | Purified | 41-0200 |
| CD90 | 5E10 | PE-Cy7 | 25-0909-42 |
| CD105 | OTI8A1 | Purified | AB156756 |
| HLA-DR | L243 | BV650 | 307602 |
| Goat Anti-Mouse IgG H + L | Polyclonal | Alexa Fluor® 488 | A-11001 |

DNA staining was based on previously published protocols. Briefly, canine UC-MSCs were cultured and passaged for flow cytometry analysis as previously described then fixed in glacial ethanol for 1 hour at −20° C. UC-MSCs were washed twice with DPBS. 50 µg/mL of RNAse H (Thermo Scientific, Cat. No. EN0201) was added to canine UC- 30 cycles of [94° C. for 1 min, 53° C.-55° C. for 30 s, and 72° C. for 30 s], and the final extension at 72° C. for 10 min. After PCR, the products were resolved on a 1%-2% agarose gel with 100 bp DNA ladder and imaged using ethidium bromine. Primers sequences and amplicon size are listed in Table 6.

TABLE 6

RT-PCR Primers

| Gene | Primer Sequence | SEQ ID NO: | Product Length (base pairs) | Tm (° C.) | Accession number |
|---|---|---|---|---|---|
| CD34-1 | GTGCCAACCTCCACAGAAAT | 1 | 409 | 55.6 | NM_001003341 |
|  | TGATGGTACTTGGGGTGTCA | 2 |  | 55.8 |  |
| CD34-2 | CCCTTTGGGTTCACAAACAC | 3 | 356 | 54.5 | NM_001003341 |
|  | TCCGAACCATTTCCAGGTAG | 4 |  | 54.2 |  |
| CD45-1 | CCATACAACTGCTCCCACAA | 5 | 438 | 55.0 | XM_005622278 |
|  | ACAAAGCCTTCCCATTCAAA | 6 |  | 52.7 |  |
| CD45-2 | AACAGCACTGTTGCCCTTCT | 7 | 386 | 57.3 | XM_005622278 |
|  | TGGTCACAATTCACGGTATCA | 8 |  | 54.0 |  |
| CD73-1 | ACTGGGACACTCTGGTTTCG | 9 | 422 | 56.9 | XM_532221 |
|  | ATTCCTTAAAGCGGCAGGAT | 10 |  | 54.4 |  |
| CD73-2 | TGCATTGCAGCCTGAAGTAG | 11 | 434 | 55.6 | XM_532221 |
|  | CTGTTTTCCCCAATTCCTGA | 12 |  | 52.7 |  |
| CD90-1 | ACATGTGAACTCCGGCTCTC | 13 | 420 | 57.0 | NM_001287129 |
|  | AGAAGCGACTCTGGGACAAA | 14 |  | 56.2 |  |
| CD90-2 | CGTGATCTATGGCACTGTGG | 15 | 440 | 55.6 | NM_001287129 |
|  | GCAGCACTGGGATTCCTTAG | 16 |  | 55.7 |  |
| CD105-1 | AGGAGTCAACACCACGGAAC | 17 | 424 | 57.2 | XM_005625330 |
|  | GATCTGCATGTTGTGGTTGG | 18 |  | 54.3 |  |
| CD105-2 | CCAATGCTACCGTGGAAGTT | 19 | 378 | 55.3 | XM_005625330 |
|  | GATTGCAGAAGGACGGTGAT | 20 |  | 55.0 |  |

For sequencing, the amplicons of the anticipated size from a randomly selected MSC line were cut from the agarose gel (e.g., CD34 409 bp, CD34 356 bp, CD73 422 bp, CD73 434 bp, CD90 440 bp, CD90 420 bp, CD105 424 bp, and CD105 378 bp), and the DNA purified. Next, the DNA was cloned into a plasmid and expanded. Following expansion of several clones, plasmid DNA was isolated and submitted to the KSU Integrated Genomics core for Illumina sequencing. The DNA sequences were checked for quality prior to alignment. The DNA sequences were aligned with canine sequences in PubMed.

Statistics—After validating that the analysis of variance (ANOVA) assumptions were met, it was used to evaluate significant main effects and/or interactions. After finding significant ANOVA terms, post hoc testing of planned comparisons was performed using either the Bonferroni correction or Holm-Sidak method. Those data are presented as average plus/minus one standard deviation. For pairwise comparisons, Students t-test was used following confirmation of statistical assumptions. If the ANOVA assumptions were not met, then Kruskal-Wallis analysis of variance on ranks was used. Those data are presented in box and whisker plots showing median and $25^{th}$ and $75^{th}$ percentile in the box and whiskers showing $10^{th}$ and $90^{th}$ percentile, with potential outliers indicated by circles. In text, the data are presented as average±one standard deviation unless stated otherwise. Regression analysis was conducted using Sigma Plot v12.5, and significant relationships were reported (regression line is plotted in cases of significant relationship). In one case, regression analysis indicated non-significant trends, and was indicated in text (no regression line is shown in graph). Throughout this manuscript, the entire dataset was used, and it included potential outliers. The original dataset is available. SigmaPlot version12.5 (Systat Software, Inc) was used for statistics and generating graphs. The graphs created using SigmaPlot were saved as EMF files. These EMF files were labeled and edited for clarity using ACD Systems of America's Canvas (version 15.5, build 1770) and rendered in TIFF format. In all cases, hypothesis testing was two-tailed and $p<0.05$ was considered "significant".

Results

Isolation of MSCs from canine umbilical cord. MSCs were isolated from umbilical cords from 30 litters of pups. The schematic for processing canine umbilical cords is provided in FIG. 1. When necessary the fetal placenta was trimmed away from the umbilical cord prior to processing. Two isolation methods were compared: the explant method and the dissociation method (FIG. 2A). The explant method involves mincing the umbilical cord into 0.2-0.5 mm pieces and adhering those pieces to the plastic plate before adding medium. The explant method produced the lowest cell yields but produced >90% viable cells (open circle in FIGS. 2A and B). MSCs from the explant method did not expand after attaching to the culture plate. This method was not tested further, and the remaining umbilical cord from 29 litters were mechanically and enzymatic disrupted before culturing, as we described previously for human umbilical cord. To evaluate the effect of tissue volume on cell yield and viability, either <30 cm of umbilical cord (black circles in FIGS. 2A and B) or >30 cm of umbilical cord was loaded into the disruptor (red circles in FIGS. 2A and B). The isolation yield and viability were not significantly changed by tissue volume. While there was a significant trend for cell yield at isolation to increase over the course of this study (regression line shown in FIG. 2A), there was no significant trend in cell viability (FIG. 2B).

Figure 3A:
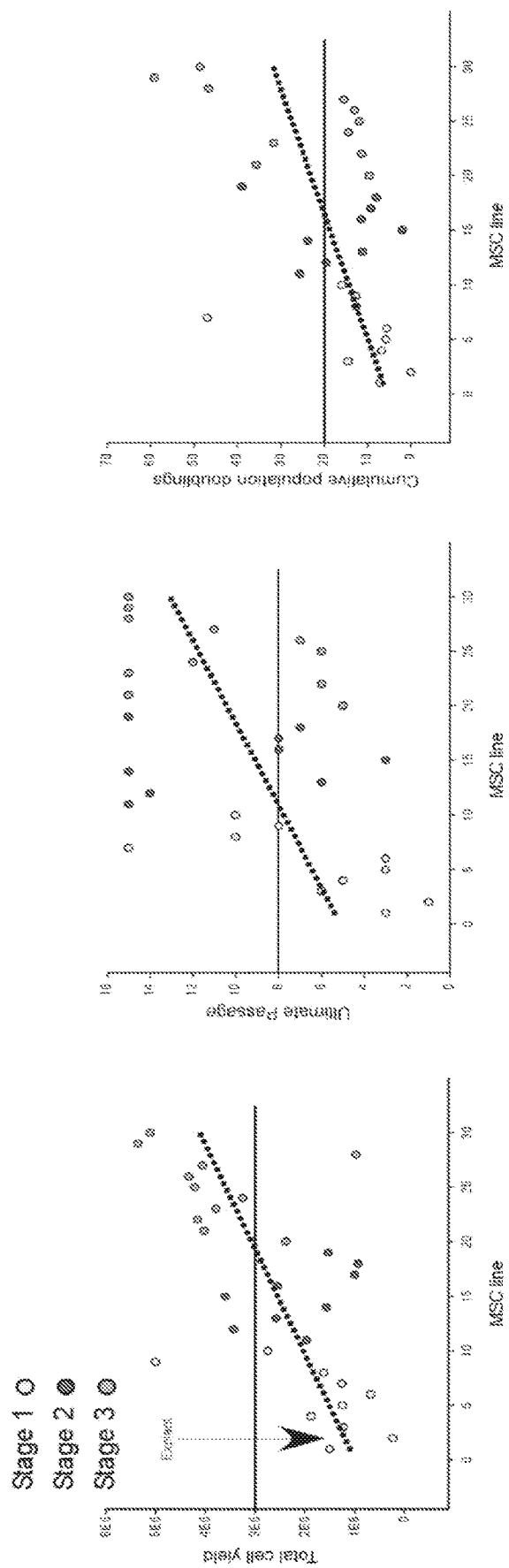
FIG. 3A shows graphs for data demonstrating stepwise improvement of canine MSC expansion. Left panel: Comparison of the three stages for cell yield at isolation. A horizontal bar indicates 3E6 cells, as a criterion for suitable starting number for expansion. Note that over the project our methods improved such that cell yield improved over time, indicated by positive and significant regression line. Note also that the three stages, indicated by color code, roughly group and follow the trend line. Middle panel: Ultimate passage achieved for 30 canine MSC lines by stage. A horizontal bar indicates 8 passages, as a criterion for minimum expansion capacity of MSCs. Note that over the project, at each stage a significant trend to increase in ultimate passage number achieved per cell line. Right Panel: Cumulative population doublings achieved by 30 MSC lines. A horizontal bar indicates 20 cumulative population doublings, as a criterion for minimum expansion of MSCs. Note that positive and significant trend line indicating improvement of MSC manufacturing over project.
Figure 3B:
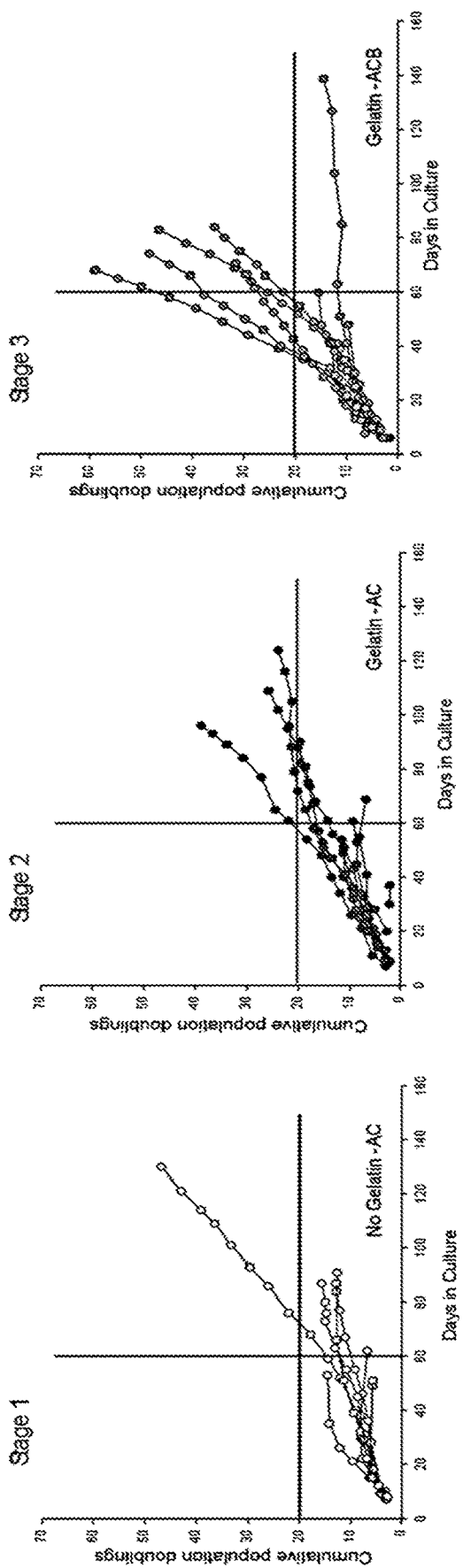
FIG. 3B shows data for cumulative population doublings for all cell lines versus days in culture for all 30 MSC lines by Stage (Stage 1, left panel; Stage 2, middle panel; Stage 3, right panel). These graphs give an indication of how rapidly MSCs expanded per passage, and the number of cumulative population doublings achieved by Stage.
Figure 3C:
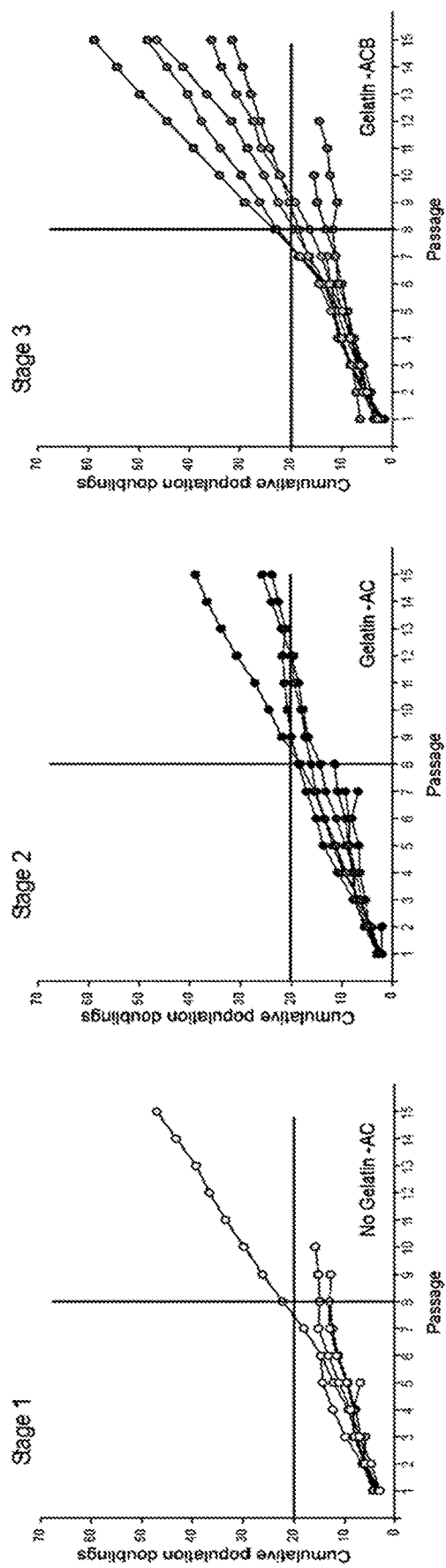
FIG. 3C shows data for cumulative population doublings for all cell lines versus passage for all 30 MSC lines by Stage (Stage 1, left panel; Stage 2, middle panel; Stage 3, right panel). Note that 15 passages were set as a maximum passage number, arbitrarily. Note that over stage, more MSC lines were able to reach the arbitrary maximum of 15 passages. IN B and C: A horizontal bar indicates 20 cumulative population doublings, as a criterion for minimum expansion of MSCs, and a vertical bar indicates 60 days in culture, as a target to try to keep manufacturing times as short as possible.

STAGE 1. The first 10 canine UC-MSC lines were isolated and expanded using previously described protocols (labeled stage 1 in FIG. 3). Specifically, the MSCs were plated on tissue culture plastic, exposed to 10% FBS containing DMEM and other standard supplements and passaged using 0.025% Trypsin-EDTA. Using these methods, only 1 MSC line of the 10 could be expanded beyond 20 cumulative population doublings, 50% of the MSC lines were able to expand beyond 10 cumulative population doublings, and only one line of 10 was able to be expanded to 15 passages (FIGS. 3B and C). In Stage 1, we learned that when compared with human UC-MSCs, canine UC-MSCs require higher plating density to expand (20,000 cells per $cm^2$ for canine UC-MSCs vs. 10,000 cells per $cm^2$ for human). In Stage 1, we performed pilot experiments with different agents for lifting MSCs off the tissue culture plate for passage (discussed below).

STAGE 2. Two modifications in UC-MSC expansion were made in Stage 2. First, tissue culture plastic was modified by coating the plates with gelatin. Second, Nattokinase was used for lifting the MSCs at time of passage. In Stage 2, the expansion potential of UC-MSC was improved based upon the following observations: First, a significant positive trend line was found for the total cell yield, the ultimate number of passages reach by MSC lines, and the cumulative population doublings achieved (FIG. 3A). Second, 6 of 9 (66%) MSC lines expanded beyond 10 cumulative population doublings (CPD) and 3 of 9 (33% expanded beyond 20 CPD) (FIG. 3B). Third, 3 of 9 MSCs lines expanded to 15 passages without senescence (FIGS. 3B and C).

STAGE 3. One modification was made in UC-MSC expansion in Stage 3 compared to Stage 2: A growth supplement, bFGF, was added to the medium (ACB medium) together with plating on gelatin-coated plates. This modification further improved in UC-MSC expansion capability. This enhancement was indicated by better yield at initial isolation (9 out of 11 exceeded 3E6 cells at isolation) (FIG. 3A), and an increase to 9 out of 11 (90%) of the MSC lines expanding beyond 10 CPD, 5 out of 11 (50%) of the MSC lines expanding beyond 20 CPD, and 5 of 11 MSC lines expanded to 15 passages (FIGS. 3B and C). The faster growth than Stage 2 was indicated by 5 of 11 MSC lines reaching or surpassing 20 cumulative population doublings by 60 days of culture (FIG. 3B), and by significantly faster population doubling time, especially in the first five passages (labeled early in FIG. 3D). The relative efficiency to maintain MSCs by Stage of development is summarized in FIG. 3F.

Figure 4:
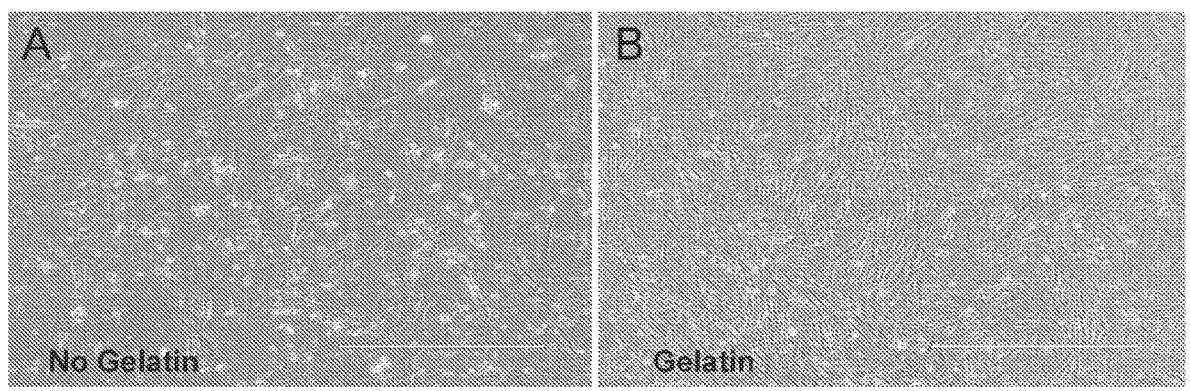
FIG. 4 shows cell culture images of the effect of gelatin-coating of plates on canine MSCs morphology. A. Canine MSC grown on tissue culture treated plastic (Stage 1). Note the heterogeneity of the culture and the presence of large, flattened cells with stress-fibers and debris. B. Canine MSCs grown on gelatin-coated plastic. Note the more homogenous appearance of fusiform cells and the smaller cell size. Calibration bar is 1 mm.
Figure 11:
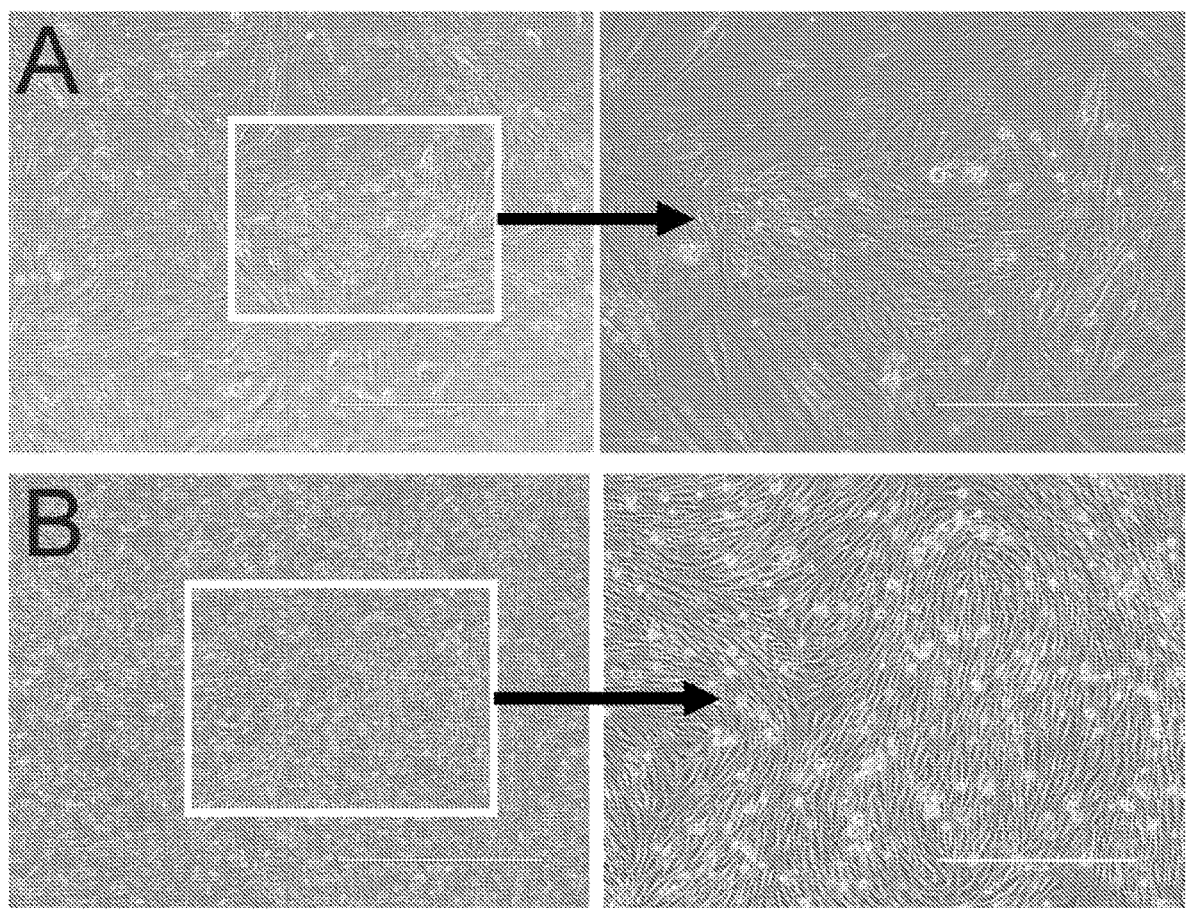
FIG. 11 shows images for expansion of canine MSCs grown on gelatin-coated plates over 24 h. A. Random field taken four days after plating canine MSCs. B. The same field taken 24 h later. Note that the field is filled with MSCs of consistent size and shape. Note the swirling pattern of the MSCs. Micrograph in B was taken just before cell passage. Note the small, round phase-bright MSCs indicating a healthy culture in log growth phase. In A and B: Inset field is shown at higher magnification in the right panel. Calibration bar in A and B is 1000 μm; calibration bar in inset is 400 μm.

Effect of Gelatin-coating of plates. The effect of gelatin-coating tissue culture plates was apparent during culture based upon cellular morphology (see FIG. 4) and cumulatively over passage (see FIG. 5), but it did not significantly affect the growth rate of MSCs during the first five passages (comparing the population doubling time between Stage 1 and 2 in FIG. 3D), or over entire culture period (comparing Stage 1 and 2 in FIG. 3E). Subjectively, UC-MSCs grown on gelatin-coated plates appear to experience less stress than MSCs grown on standard tissue culture plates (compare FIG. 4, left and right). For example, UC-MSCs grown on tissue culture plastic had more debris, and more of the large, flattened cells with stress-fibers (FIG. 4 left), compared with MSCs grown on gelatin-coated plates (FIG. 4 right). This subjective observation was supported by other observations. As shown in FIG. 5A, there was a trend for MSCs grown on gelatin-coated plates to have greater cumulative population doublings, and in FIG. 5B, there were significantly more passages until senescence when MSCs were grown on gelatin-coated plates. The attachment of MSCs to gelatin-coated plates also enhanced the colony forming fibroblast efficiency (see FIGS. 5C and D). As MSCs grew on gelatin-coated plates, a pattern in the arrangement of their cell bodies was observed when the same field was observed from day to day (see FIG. 11).

Comparing method of lifting cells for passage. Based upon our experience with human MSCs (data not shown) and based on the canine MSC literature, we assumed that 0.025% Trypsin-EDTA was suitable for canine MSCs. To evaluate this hypothesis, pilot experiments were conducted using 0.025% Trypsin-EDTA compared to TrypLE, Dispase, TrypLE Express and 1.75% Nattokinase. We determined that dispase, TrypLE and Trypsin-EDTA negatively impact yield, viability, and downstream effects (comparison data not shown). Trypsin-EDTA and Dispase were not successful and resulted in failure to proliferate after passage (data not shown). TrypLE was unable to efficiently lift canine MSC from the plate for passage (data not shown). In contrast, Nattokinase improved MSC viability at passage compared to TrypLE Express (FIGS. 6A & B). The difference between cell viability and MSC yield between TrypLE Express (0.05%) versus Nattokinase (1.75%) was significant (see FIGS. 6B & D). Nattokinase was used to lift MSCs in Stages 2 and 3.

Cryopreservation effects and ability to revive UC-MSCs from cryostorage. It appears that canine UC-MSCs are less robust than human UC-MSCs in terms of their expansion potential, response to chemical stress, and attachment ability. We then queried whether canine UC-MSCs were sensitive to cryopreservation and could be revived and expanded after cryostorage. To answer this question, 33 UC-MSC samples were frozen and stored an average of 185 days (median 191 days, range 4-448 days, 25th percentile 34.5 and $75^{th}$ percentile 292.5 days) in vapor phase liquid nitrogen then thawed and tested for viability. There was a significant drop in MSC viability of 7.9±4.8% after thawing (see FIGS. 7A and B). While viability decreased due to freeze/thaw, there was no significant effects of length of storage on change in MSC viability (see FIGS. 7C and D). Note that the regression line shown in FIG. 7D is not significant. All thawed cell lines expanded for multiple passages following thaw.

Tri-lineage differentiation. Many papers in the canine MSC literature do not demonstrate tri-lineage differentiation, and for that reason some have argued that differentiation to two lineages is sufficient to demonstrate multipotent progenitors in canine MSCs. In pilot testing, 8 different differentiation methods gleaned from the literature were compared for tri-lineage differentiation (see FIGS. 14-16). As seen in FIG. 8, canine UC-MSCs successfully differentiate to bone-forming, cartilage-forming and fat-forming lineages. The efficiency to differentiate canine UC-MSCs to adipocytes was low, but this probably reflected cell loss during differentiation and further optimization is likely possible.

Figure 9:
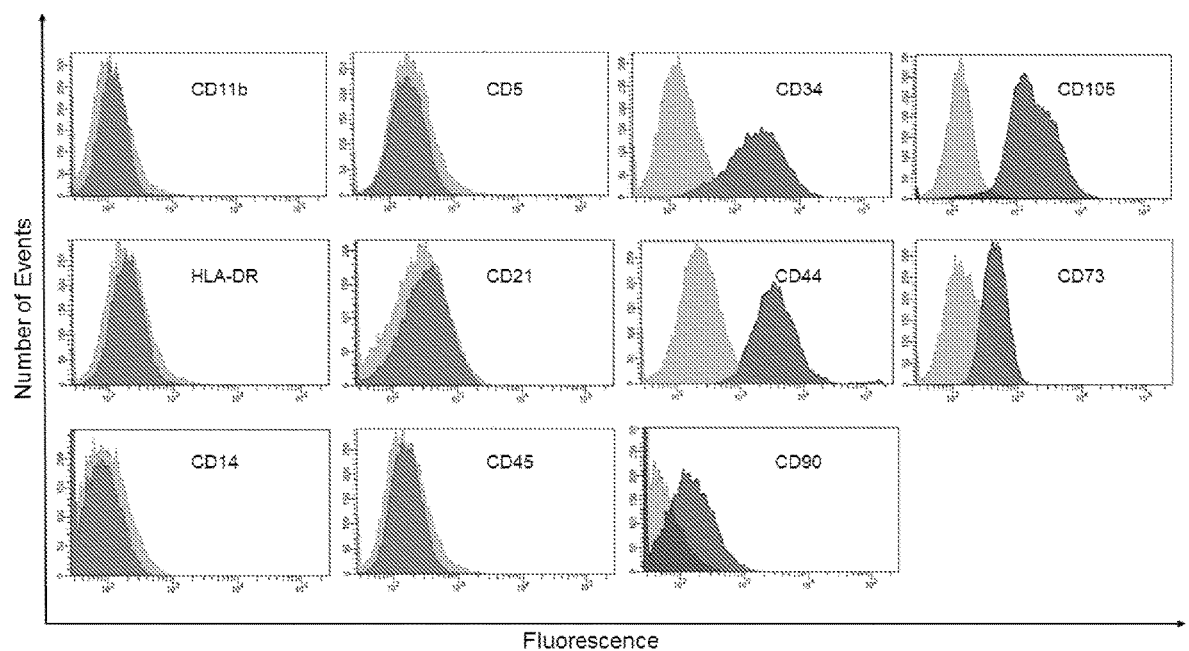
FIG. 9 shows immunophenotyping of canine umbilical cord derived mesenchymal stromal cells (UC-MSCs) based upon representative flow cytometry histograms with unstained cells (light grey) vs. antibody labeled sample (dark gray) for 2 or 3 canine MSC cell lines, depending on surface marker. Based on the prominent shift in fluorescence intensity for the entire population, the data is interpreted as follows: MSCs were positive for: CD34, CD105, CD44, CD73 and CD90. MSCs were negative for CD11b, CD5, HLA-DR (MHC-II), CD21, CD14, CD45.
Figure 12:
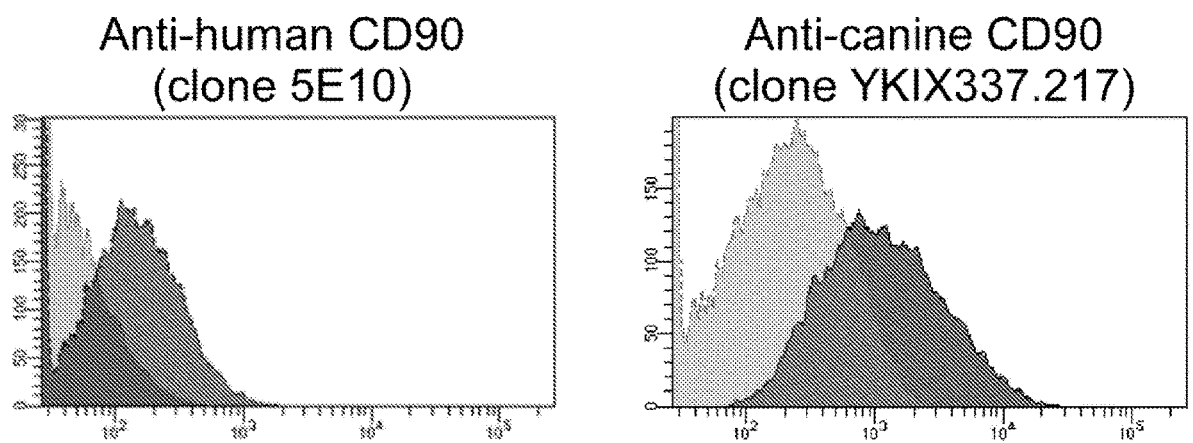
FIG. 12 shows a comparison of mouse anti-human CD90 (LEFT panel) and rat anti-canine CD90 (RIGHT panel) flow cytometry results. By inspection, no frank differences in the positive staining shift were observed. We conclude that the mouse anti-human CD90 (5E10) and the rat anti-canine CD90 (YKIX337.217) work equally well to detect surface expression of Thy1 in canine UC-MSCs.

Immunophenotyping by Flow cytometry. We performed extensive testing of antibodies to find those that work best for canine UC-MSCs (see Table 5). While representative data is presented in FIG. 9, we validated the staining patterns provided here in 2 or 3 different canine UC-MSC lines at passages 5 to 8. Canine UC-MSCs positively labeled for CD90, CD73, CD44, and CD105, as indicated by the mean fluorescence intensity shift in the monomodal population of gated cells but the size of the positive shifts were not as large as we have seen previously when working with human UC-MSCs. We wondered whether the smaller shift was due to using a mouse anti-human CD90 (clone 5E10), instead of a canine specific antibody. To address this concern, we repeated the flow cytometry using a rat anti-canine CD90 (clone YKIX337.217). As can be seen in FIG. 12, the positive shift in CD90 was not frankly affected by using a canine specific rat anti-CD90 compared to the mouse human specific anti-CD90. We conclude that the surface expression of canine UC-MSCs is less than human UC-MSCs. UC-MSCs also displayed positive labeling for CD34, which is typically considered a hematopoietic stem cell marker. To confirm whether CD34 was expressed by canine MSCs, we performed follow-up experiments which are described in the next section, below. As expected, canine MSCs had negative labeling for MHC class II, CD11b, CD14, CD21, CD5, and CD45.

Figure 13:
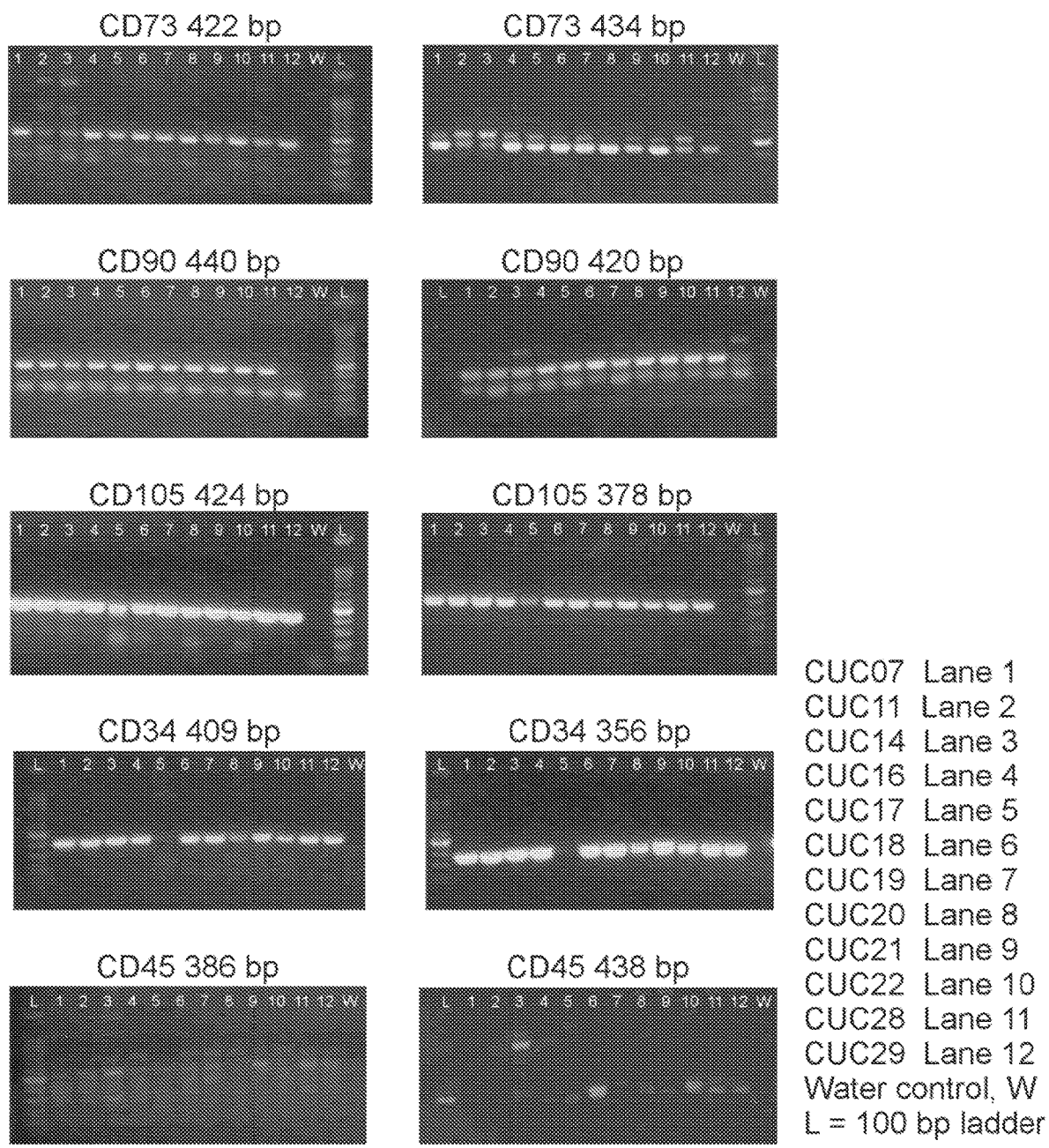
FIG. 13 shows RT-PCR analysis of MSC markers in 12 canine MSC lines. Two RT-PCR primer sets that span an intron were designed using the NCBI Genebank data for canine CD73, CD90, CD105, CD34 and CD45 (see Table 6). Total RNA was collected from 12 canine MSC lines and processed for RT-PCR. The RT-PCR results indicate that canine MSC lines make messenger RNA (mRNA) for CD73, CD90, CD105 and CD34. There is no RT-PCR evidence that canine MSC lines make mRNA for CD45. For CD73 primer set 422 bp and 434, CD90 primer set 440 bp and 420, CD105 primer set 424 bp and 378, and CD34 primer set 409 bp and 356, DNA samples from three independent MSC lines (e.g., amplicons of the expected size) were cut from the agarose gel, purified and submitted for sequencing. DNA sequencing confirmed 99-100% identity.

Confirmation of CD34 expression by RT-PCR. Since we observed CD34 positive labeling for canine UC-MSCs, we confirmed this by an alternative means. Two PCR primer pairs, spanning an intron, were designed for CD73, CD90, CD105, CD34 and CD45 to perform RT-PCR on RNA samples obtained from 12 different canine MSC lines. As seen in FIG. 13, canine MSCs express mRNA for CD73, CD90, CD105, and CD34, as indicated by finding the appropriately sized amplicon after RT-PCR amplification for both primer pairs tested. As seen in FIG. 13, both PCR primer sets confirm expression of CD73, CD90, CD105, and CD34 mRNA. However, the 434 bp PCR primer pair for CD73 showed multiple bands, a strong band between 400 and 500 bp of the expected product, and in lanes 2, 3 and 11, a second, larger product, suggesting non-specific amplification. Therefore, we confirmed the specificity of the PCR findings for CD34, CD73, CD90 and CD105 by sequencing. The sequences were verified to be 99-100% matches to the expected canine mRNA (see Table 7). In contrast, canine MSCs did not express mRNA for CD45 to a detectable amount. This suggests that the flow cytometry results are valid since 11 of 12 lines tested (>91%) of the canine UC-MSC lines expanded using our culture and passage conditions express CD34 mRNA and protein.

TABLE 7

RT-PCR

| Target | Blast |
|---|---|
| CD34-1 | CD34P1.CUC07-3, M13R: Blast with Genbank NM_001003341, incorporated by reference herein; Good (383-791:100% identity) |
| CD34-2 | CD34P5.CUC16-9, M13R: Blast with Genbank NM_001003341, incorporated by reference herein; Good (338-693:100% identity) |
| CD73-1 | CD73P2.CUC18-3, M13R: Blast with Genbank XM_532221, incorporated by reference herein; Good (543-964: 100% identity) |
| CD73-2 | CD73P8CUC20-9_M13R: Blast with Genbank XM_532221, incorporated by reference herein; Good (486-919: 100% identity) |
| CD90-1 | CD90P9CUC20-2_M13R: Blast with Genbank NM_001287129, incorporated by reference herein; Good (411-830:99% identity) |
| CD90-2 | CD90P4CUC17-1_M13R: Blast with Genbank NM_001287129, incorporated by reference herein; Good (287-726:100% identity) |
| CD105-1 | CD105P6CUC28-1_M13R: Blast with Genbank XM_005625330, incorporated by reference herein; Good (744-1167:99% identity) |
| CD105-2 | CD105P10CUC14-1_M13R: Blast with Genbank XM_005625330, incorporated by reference herein; Good (527-904:100% identity) |

Figure 10:
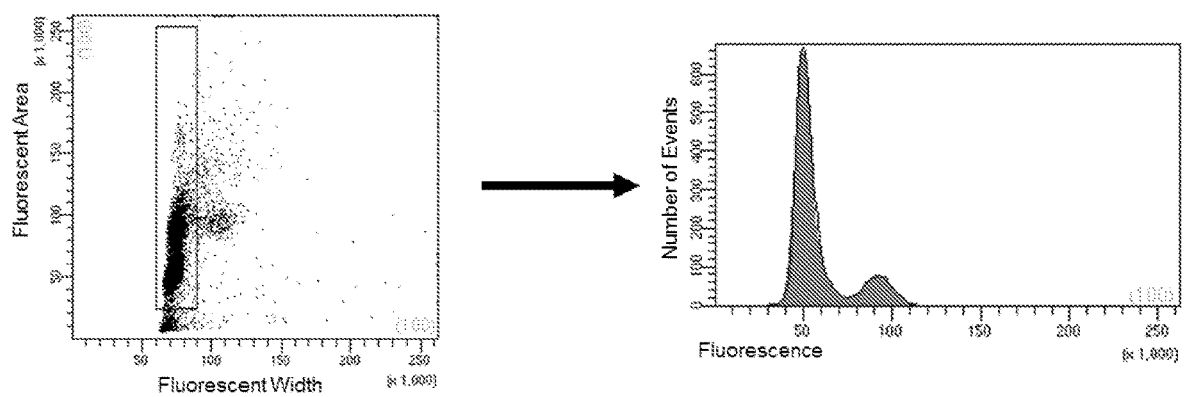
FIG. 10 shows flow cytometric analysis of canine MSC cell cycle and polyploidy. The left panel illustrates the gating strategy to exclude doublets and debris. The histogram in the right panel indicates the stage of cell cycle based upon DNA staining. The majority of canine MSCs (approximately 78%) were in the G0/G1 phase with fewer cells in the G2/M phase (16%), and 6% in the S phase.

Evaluation of cell cycle by flow cytometry. Canine UC-MSC ploidy and cell cycle partitioning was evaluated using flow cytometry, as shown in FIG. 10. The analysis of cell cycle revealed approximately 78% of the cells in G0/G1, approximately 16% cells in G2/M phase, and approximately 8% of the cells in S phase. Note that no tetraploid or aneuploid cells were detected.

Discussion

Here, canine UC-MSC isolation and manufacturing protocols were generated using umbilical cords from 30 litters. Five new findings encapsulate this work. First, the manufacturing of canine UC-MSCs was fundamentally different from human. By using human UC-MSC manufacturing protocols on canine cells, as done in Stage 1, most lines cease proliferation or senesce rapidly, since only 50% of the MSC lines could be maintained beyond passage 4. Second, canine UC-MSC manufacturing was improved by adding cell attachment factors, such as gelatin-coating to tissue culture plates. Work from Devireddy et al. had previously indicated that gelatin-coating was important for canine MSCs when they are expanded in serum-free, defined medium. The current work indicates that addition of this attachment factor extends the longevity of MSC culture and improves CFU-F efficiency when MSCs are grown with FBS supplemented medium. When human MSCs are culture in serum free conditions, the addition of attachment factors is critical for their expansion. These changes, represented here by shift from Stage 1 to Stage 2, enabled 50% of the MSC lines expand to passage 8. Furthermore, use of gelatin-coating significantly enhanced longevity of MSCs' self-renewal capability indicated by higher cumulative population doublings, and improved colony forming efficiency. Third, an improvement was noted when Nattokinase was used for lifting MSCs for passage. Nattokinase is a serine protease and a fibrinolytic enzyme isolated from *Bacillus subtillis natto* B-12 in traditionally fermented Japanese soybean. Previously, Carrion and colleagues reported that Nattokinase could extract bone marrow-derived MSCs out of a fibrin gel better than trypsin-EDTA or TrypILE. We found Nattokinase to be more effective for lifting canine MSCs than standard lifting agents, terms of yield and viability. Lifting MSCs and passaging via Trypsin-EDTA, dispase, or TrypLE reduced passage yield and viability. In short, Nattokinase significantly improved cell viability and canine UC-MSC yield at passage. Fourth, canine UC-MSC viability is reduced by cryopreservation. However, the impact of cryopreservation on canine UC-MSCs is no worse than human UC-MSCs (data not shown), and all 33 canine UC-MSC lines tested here re-entered the cell cycle and expanded following cryostorage. Importantly, the length of cryostorage had no significant impact on revival viability or expansion capability of canine UC-MSCs. Fifth, we evaluated antibodies to be used as a standardized panel for evaluation of canine UC-MSCs. While overcoming the early senescence of canine MSC was a critical hurdle, the next challenge is to characterize canine MSCs. This is called a challenge because no consensus set of antibodies has been described for canine MSC surface markers. Here, we addressed this issue and the monoclonal antibodies used in the canine MSC field was reviewed and a list of antibodies that have been tested for canine MSC characterization provided in Table 4. Antibodies used here are highlighted on this list. As can be seen when reviewing this table, the flow cytometry results using these antibodies were conflicting: Some of the antibodies performed well, meaning that they produced consistent results across different laboratories, and others were less consistent. In Table 5, the antibodies that worked here, and henceforth might be considered for a standard flow cytometry marker set for canine MSC immunophenotype characterization, is provided. Two points raised by our flow cytometry work bears additional discussion. First, the positive shift for CD73 and CD90 staining was less than what we have seen in human UC-MSCs. We tested whether using an anti-canine specific CD90 would improve the flow cytometry positive shift, compared to the anti-human CD90. As shown in FIG. 12, the positive shift was not frankly different, suggesting that the expression of CD90 was not as high in canine MSCs. Second, canine UC-MSCs appear to express CD34. This observation is controversial, since it is in contrast to the ISCT consensus marker set for human MSCs. However, it should be noted that three other laboratories have reported CD34 staining of canine MSCs, while most laboratories don't observe CD34 staining (see Table 4). Note also that the flow cytometry results for CD34 were confirmed by RT-PCR, and 11 out of 12 UC-MSC lines expressed CD34 mRNA (shown in FIG. 13), and further verified by DNA sequencing of the amplicons (data not shown). Together, this suggests that our cell source, culture and passaging conditions result in CD34 expression by UC-MSCs. These five new findings indicate the importance for optimizing cell culture conditions and may have downstream impact on the clinical testing of canine UC-MSCs.

In the human MSC field, commercial human MSC flow cytometry characterization kits provide as a "standard" for comparison of MSC surface markers per the ISCT definition across the field. In contrast, no standardized antibody kit is available for the canine to facilitate between laboratory MSC comparisons. Canine MSCs positive surface marker expression, e.g., the shift in mean fluorescence intensity, is less robust than observed in human MSCs. Specifically, the shift in fluorescence intensity for canine MSCs for markers CD73, CD90, CD105 and CD44 is smaller than observed in human MSCs. This could be due to differences in the affinity of the antibody for canine versus human molecule, or differences in the expression level between species, or due to cell culture related "artifact". Canine UC-MSCs were negative for hematopoietic markers CD45, CD5, CD21, CD14, CD11b, and for HLA-DR (MHC class II), like human MSCs. Review of the literature provided in Table 4 revealed that some laboratories reported CD34 positive canine MSCs and other laboratories, using the same CD34 clone, find no MSCs staining for CD34. Our review found that CD34 positive cells did not break cleanly such that CD34 expression was found only in tissue specific MSCs, or only in early passage MSCs. For example, one paper found CD34 positive cells in 18.4% adipose tissue-derived MSCs and 3.6% bone marrow-derived MSCs. Another paper reported 29.2% CD34 positive adipose tissue-derived MSCs. A third paper shows that CD34 expression (10%) adipose tissue-derived MSCs compared with 1% of the MSCs were CD105 positive. Finally, Ryu et al. indicated that CD34 was expressed at low level in passage 1 adipose tissue-derived MSCs, but the expression was lost by passage 7. Based upon our results and the previous reports, some possible explanations for the disparity in CD34 expression can be considered. First, the observed CD34 staining here is real and CD34 expression in MSCs may be induced by culture or passaging conditions used here, since CD34 antibody clone we used performs consistently with high specificity in canine peripheral blood and bone marrow immunophenotyping (KK and NS personal observations). Flow cytometry results for CD34 is supported by our RT-PCR (shown in FIG. 13) and DNA sequencing results (data not shown), which demonstrated CD34 expression in 11 of 12 canine UC-MSC lines. Second, as indicated by 3D cell culture work, it is possible that cell-substrate and cell-cell interactions may alter surface marker phenotype. Follow-up work is needed to determine whether CD34 expression is due to using UC-MSCs, and to determine whether MSCs from other tissue sources can be induced to express CD34 by altered culture conditions.

Previous reports indicated that expanding canine MSCs was problematic, for example, that canine MSCs can't proliferate beyond passage 7, and that canine MSCs must be characterized around passage 3. Some previous studies did not demonstrate tri-lineage differentiation or they performed RT-PCR to demonstrate gene expression in lieu of flow cytometry. We attribute these "problems", e.g., lack of multi-lineage differentiation, loss of differentiation potential), to senescence associated with inappropriate cell attachment and passaging conditions. Canine UC-MSCs have different medium requirements than human UC-MSCs, and that the addition of bFGF to the medium formulation significantly improved population doubling time, and longevity in culture such that lines could be maintained beyond passage 11. The addition of bFGF is known to have a mitogenic effect on MSCs of other species. In summary, we demonstrated that bFGF not only improved growth rate, but it also may play a role in preventing UC-MSC senescence.

The canine UC-MSCs were capable of differentiation to bone-, cartilage- and fat-producing cells. Note that tri-lineage differentiation of canine MSCs is a point where laboratories have not consistently demonstrated the ISCT MSC definition. While saying this, we also observed low efficiency to differentiate UC-MSCs to adipocytes. We suggest that tri-lineage differentiation be adopted as part of standard for defining canine MSCs to meet the ISCT "multipotent cell" definition. We also suggest that further refinement in differentiation protocols would improve compliance. Note that more recently, the ISCT released revised MSC characterization criteria that includes functional bioassays. We consider that additional of a functional bioassay important for canine UC-MSC characterization but it is beyond the scope of the present report.

Canine MSCs derived from different tissues such as adipose tissue, bone marrow or tissues discarded at birth such as placenta, amniotic membranes or umbilical cord have been compared by others. In that regard, the advantages of MSCs derived from umbilical cord are clear. For example, MSC from the umbilical cord are isolated from subjects of a consistent, young age, and there is the potential to create banks of allogeneic cells for clinical use. Therefore, manufactured and banked umbilical cord MSCs have the potential as an off-the-shelf allogeneic product, similar to umbilical cord blood hematopoietic stem cells. In that regard, the present report provides an important contribution to the canine MSC literature.

MSCs are widely investigated in the field of regenerative medicine, as indicated by the number of MSC clinical trials listed on the ClinicalTrials.gov website. This clinical research "push" is not limited to human medicine, since there have been MSC trials conducted in veterinary medicine, too. Thus, the demand for MSCs in large quantities and of "clinical grade" is present in both human and veterinary medicine. This demand for MSCs, however, is not well-met. There is no standardized method to isolate, expand, characterize and freeze/thaw MSCs that is universally accepted. There is no standard to compare MSC quality for their clinical potency. The lack of such standards might be an impediment for clinical translation, since each laboratory argues its case separately with the FDA. It seems likely that new manufacturing and qualification processes are needed to produce both large numbers but also MSCs manufactured of a quality standard.

In conclusion, this report addresses some limitations associated with manufacturing canine MSCs for clinical applications. While significant improvements are reported here, further optimization might be possible. The knowledge gap between human UC-MSCs and canine UC-MSCs should be closed in order to maximize the usefulness of this companion animal species as a model for human UC-MSC clinical translation.

The invention claimed is:

1. A method of expanding isolated canine umbilical cord mesenchymal stromal cells (UC-MSCs) from umbilical cord tissue, said method comprising:
adding said isolated canine UC-MSCs from umbilical cord tissue and cell culture media to a first adherent cell culture substrate, said cell culture media being supplemented with FBS, glutamine, and fibroblast growth factor-basic, wherein said first adherent cell culture substrate has a cell culture surface that is coated with a plurality of cell adhesion molecules selected from the group consisting of gelatin, laminin, fibronectin, poly-lysine, vibronectin, collagen, and/or fibrin;
incubating said isolated canine UC-MSCs under conditions to yield cultured canine UC-MSCs;
transferring said cultured canine UC-MSCs to a second adherent cell culture substrate, wherein said transferring comprising subjecting said cultured canine UC-MSCs to a dissociation reagent to detach said cells from said first adherent cell culture substrate and moving said detached cells to said second adherent cell culture substrate, wherein said second adherent cell culture substrate has a cell culture surface that is coated with a plurality of cell adhesion molecules selected from the group consisting of gelatin, laminin, fibronectin, poly-lysine, vibronectin, collagen, and/or fibrin; and
incubating said isolated canine UC-MSCs under conditions to yield expanded canine UC-MSCs, wherein said expanded canine UC-MSCs have a cell population that is greater than said isolated canine UC-MSCs.

2. The method of claim 1, wherein said first adherent cell culture substrate and said second adherent cell culture substrate each have a cell culture surface that further:
has a surface treatment such that said surface has a modified surface charge, wettability/hydrophilicity, stiffness, and/or roughness of the surface; and/or
comprises a three-dimensional biocompatible matrix, said cells being suspended in said matrix.

3. The method of claim 1, wherein said isolated canine UC-MSCs are added to said first adherent substrate at a level of at least about 20,000 live cells per $cm^2$.

4. The method of claim 1, wherein said dissociation reagent is nattokinase.

5. The method of claim 1, wherein said dissociation reagent is free of trypsin or trypsin replacement reagents.

6. The method of claim 1, further comprising providing cryopreserved isolated canine UC-MSCs and thawing said cryopreserved isolated canine UC-MSCs before adding said cells to said first adherent substrate, wherein said cryopreserved isolated canine UC-MSCs have at least 75% post-thaw viability.

7. The method of claim 1, wherein said culture media consists essentially of DMEM, supplemented with FBS, glutamine, fibroblast growth factor-basic, and optional antibiotic-antimycotic.

8. The method of claim 1, further comprising repeating said transferring and incubating for at least 7 total passages, wherein said expanded canine UC-MSCs maintain multipotent progenitor characteristics of primary isolated canine UC-MSCs.

9. The method of claim 1, further comprising differentiating said expanded canine UC-MSCs into osteogenic, chondrogenic, or adipogenic cell lineages.

10. The method of claim 9, comprising plating said expanded canine UC-MSCs at a cell density of at least about 200,000 live cells per $cm^2$ for differentiation into a chondrogenic lineage.

11. The method of claim 9, comprising plating said expanded canine UC-MSCs at a cell density of at least about 20,000 live cells per $cm^2$ for differentiation into an osteogenic lineage.

12. The method of claim 9, comprising plating said expanded canine UC-MSCs at a cell density of at least about 75,000 live cells per $cm^2$ for differentiation into an adipogenic lineage.

13. A method of detecting canine UC-MSCs in a cell population, said method comprising preparing a cell population from canine umbilical cord tissue comprising dissociated canine MSCs, and selecting for CD34+, CD44+, CD73+, CD90+, and CD105+ cells, which are not expressing CD5, CD11b, CD14, CD21, andand/or CD45, by incubating said cell population with a plurality of antibodies for canine UC-MSCs cell surface markers: CD5, CD11b, CD21, CD14, CD34, CD44, CD45, CD73, CD90, and CD105, and detecting cells that have bound or have not bound to one or more of said antibodies.

14. The method of claim 13, further comprising expanding said selected cells in culture and inducing said expanded cells to differentiate into osteogenic, chondrogenic, or adipogenic cell lineages.

15. An enriched population of canine UC-MSCs produced by the method of claim 13.

16. A method of improving post-thaw viability of cryopreserved canine UC-MSCs from umbilical cord tissue, said method comprising:
thawing a cryopreserved composition of isolated canine UC-MSCs from umbilical cord tissue dispersed in a culture media consisting essentially of DMEM, supplemented with FBS, glutamine, fibroblast growth factor-basic, and optional antibiotic-antimycotic, and a DMSO cryoprotectant solution;
washing said thawed canine UC-MSCs to remove said cryoprotectant solution; and immediately after said washing, plating said thawed canine UC-MSCs on an adherent substrate.

\* \* \* \* \*